United States Patent
Hyde et al.

(10) Patent No.: US 8,884,809 B2
(45) Date of Patent: Nov. 11, 2014

(54) PERSONAL ELECTRONIC DEVICE PROVIDING ENHANCED USER ENVIRONMENTAL AWARENESS

(75) Inventors: Roderick A. Hyde, Redmond, WA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 31 days.

(21) Appl. No.: 13/136,404

(22) Filed: Jul. 29, 2011

(65) Prior Publication Data

US 2012/0274498 A1    Nov. 1, 2012

Related U.S. Application Data

(63) Continuation-in-part of application No. 13/068,049, filed on Apr. 29, 2011, which is a continuation-in-part of application No. 13/068,051, filed on Apr. 29, 2011.

(51) Int. Cl.
*G01S 13/00* (2006.01)
*G08B 23/00* (2006.01)
*G01S 13/06* (2006.01)
*G01S 13/86* (2006.01)
*G01S 13/56* (2006.01)
*G01S 13/02* (2006.01)

(52) U.S. Cl.
CPC ............ *G01S 13/86* (2013.01); *G01S 13/0209* (2013.01); *G01S 13/06* (2013.01); *G01S 13/56* (2013.01)
USPC ................. 342/28; 342/89; 342/90; 342/175; 342/189; 340/573.1

(58) Field of Classification Search
USPC ................. 342/52–58, 89–97, 175, 189, 197; 340/573.1, 573.4, 573.5, 573.7; 382/103, 115; 600/453, 454, 455, 457; 455/404.1, 404.2, 414.1, 456.1
See application file for complete search history.

(56) References Cited

U.S. PATENT DOCUMENTS

| | | | | |
|---|---|---|---|---|
| 4,513,748 A | * | 4/1985 | Nowogrodzki et al. | ...... 600/453 |
| 4,958,638 A | * | 9/1990 | Sharpe et al. | ................. 600/407 |
| 5,361,070 A | * | 11/1994 | McEwan | .......................... 342/21 |
| 5,507,291 A | * | 4/1996 | Stirbl et al. | .................... 600/407 |
| 5,519,400 A | * | 5/1996 | McEwan | ......................... 342/28 |
| 5,544,661 A | * | 8/1996 | Davis et al. | .................... 600/513 |
| 5,579,001 A | * | 11/1996 | Dempsey et al. | ......... 340/870.01 |
| 6,031,454 A | | 2/2000 | Lovejoy et al. | |
| 6,062,216 A | * | 5/2000 | Corn | ......................... 128/204.23 |
| 6,122,537 A | * | 9/2000 | Schmidt | ........................ 600/407 |
| 6,132,371 A | * | 10/2000 | Dempsey et al. | ............. 600/300 |
| 6,295,506 B1 | * | 9/2001 | Heinonen et al. | ............. 702/104 |

(Continued)

OTHER PUBLICATIONS

Citation for Michahelles et al.; Published at the Eighth International Symposium on Wearable Computers; Oct. 31-Nov. 3, 2004; pp. 4-7, retrieved on Jul. 18, 2012 from the internet at http://ieeexplore.ieee.org/xpls/abs_all.jsp?arnumber=1364682&isnumber=29895&tag=1.

(Continued)

*Primary Examiner* — Peter Bythrow
(74) *Attorney, Agent, or Firm* — Dorsey & Whitney LLP

(57) ABSTRACT

A personal electronic device is configured to provide enhanced user awareness of the environment responsive to data from a micro-impulse radar (MIR).

54 Claims, 8 Drawing Sheets

(56) References Cited

U.S. PATENT DOCUMENTS

| | | | |
|---|---|---|---|
| 6,315,719 B1* | 11/2001 | Rode et al. | 600/300 |
| 6,396,416 B1* | 5/2002 | Kuusela et al. | 340/870.28 |
| 6,417,797 B1 | 7/2002 | Cousins et al. | |
| 6,454,708 B1* | 9/2002 | Ferguson et al. | 600/300 |
| 6,456,231 B1 | 9/2002 | McEwan | |
| 6,466,125 B1* | 10/2002 | Richards et al. | 340/573.4 |
| 6,535,161 B1 | 3/2003 | McEwan | |
| 6,544,174 B2* | 4/2003 | West et al. | 600/300 |
| 6,611,783 B2* | 8/2003 | Kelly et al. | 702/150 |
| 6,696,957 B2* | 2/2004 | Shepher | 340/573.1 |
| 7,001,334 B2 | 2/2006 | Reed et al. | |
| 7,106,885 B2* | 9/2006 | Osterweil et al. | 382/103 |
| 7,440,779 B2 | 10/2008 | Kim et al. | |
| 7,567,200 B1* | 7/2009 | Osterweil | 342/28 |
| 7,650,144 B2* | 1/2010 | Nakamura et al. | 455/420 |
| 7,753,849 B2* | 7/2010 | Morgan et al. | 600/453 |
| 7,898,455 B2 | 3/2011 | Rosenbury | |
| 7,916,066 B1 | 3/2011 | Osterweil | |
| 8,052,600 B2* | 11/2011 | Beck et al. | 600/301 |
| 8,454,528 B2* | 6/2013 | Yuen et al. | 600/534 |
| 2002/0021231 A1* | 2/2002 | Schlager et al. | 340/984 |
| 2002/0120184 A1* | 8/2002 | Beck et al. | 600/300 |
| 2002/0198632 A1 | 12/2002 | Breed et al. | |
| 2003/0135097 A1* | 7/2003 | Wiederhold et al. | 600/301 |
| 2003/0160701 A1 | 8/2003 | Nakamura et al. | |
| 2004/0027270 A1* | 2/2004 | Fullerton et al. | 342/28 |
| 2004/0249258 A1* | 12/2004 | Tupin et al. | 600/407 |
| 2005/0040230 A1* | 2/2005 | Swartz et al. | 235/383 |
| 2005/0046569 A1 | 3/2005 | Spriggs et al. | |
| 2005/0046584 A1 | 3/2005 | Breed | |
| 2005/0195101 A1* | 9/2005 | Stevens et al. | 342/28 |
| 2006/0001545 A1* | 1/2006 | Wolf | 340/573.1 |
| 2006/0061504 A1* | 3/2006 | Leach et al. | 342/22 |
| 2006/0119473 A1 | 6/2006 | Gunderson et al. | |
| 2006/0195050 A1* | 8/2006 | Alwan et al. | 600/595 |
| 2006/0209176 A1* | 9/2006 | Nakamura et al. | 348/14.01 |
| 2006/0239471 A1* | 10/2006 | Mao et al. | 381/92 |
| 2006/0253598 A1* | 11/2006 | Nakamura et al. | 709/230 |
| 2007/0030156 A1* | 2/2007 | Schlager et al. | 340/573.1 |
| 2007/0100666 A1 | 5/2007 | Stivoric et al. | |
| 2007/0176821 A1 | 8/2007 | Flom et al. | |
| 2007/0197881 A1* | 8/2007 | Wolf et al. | 600/300 |
| 2008/0007445 A1 | 1/2008 | Leach, Jr. et al. | |
| 2008/0064413 A1 | 3/2008 | Breed | |
| 2008/0071467 A1 | 3/2008 | Johnson et al. | |
| 2008/0082018 A1* | 4/2008 | Sackner et al. | 600/538 |
| 2008/0088462 A1* | 4/2008 | Breed | 340/573.1 |
| 2008/0101329 A1* | 5/2008 | Richards et al. | 370/347 |
| 2008/0108372 A1* | 5/2008 | Breed | 455/456.1 |
| 2008/0119716 A1* | 5/2008 | Boric-Lubecke et al. | 600/407 |
| 2008/0167535 A1* | 7/2008 | Stivoric et al. | 600/301 |
| 2008/0171922 A1* | 7/2008 | Teller et al. | 600/301 |
| 2008/0238757 A1* | 10/2008 | Lin et al. | 342/22 |
| 2008/0270172 A1* | 10/2008 | Luff et al. | 705/1 |
| 2008/0275309 A1* | 11/2008 | Stivoric et al. | 600/300 |
| 2008/0275349 A1* | 11/2008 | Halperin et al. | 600/484 |
| 2008/0287751 A1* | 11/2008 | Stivoric et al. | 600/301 |
| 2008/0287817 A1* | 11/2008 | Stivoric et al. | 600/508 |
| 2008/0311882 A1* | 12/2008 | Schlager et al. | 455/404.2 |
| 2009/0017910 A1* | 1/2009 | Rofougaran et al. | 463/36 |
| 2009/0052859 A1* | 2/2009 | Greenberger et al. | 386/46 |
| 2009/0058711 A1* | 3/2009 | Dixon et al. | 342/28 |
| 2009/0138805 A1* | 5/2009 | Hildreth | 715/745 |
| 2009/0177068 A1* | 7/2009 | Stivoric et al. | 600/365 |
| 2009/0215488 A1 | 8/2009 | Causey et al. | |
| 2010/0130873 A1* | 5/2010 | Yuen et al. | 600/484 |
| 2010/0141443 A1* | 6/2010 | Romero et al. | 340/551 |
| 2010/0198083 A1* | 8/2010 | Lin et al. | 600/484 |
| 2010/0214149 A1 | 8/2010 | Kuhn | |
| 2010/0240999 A1* | 9/2010 | Droitcour et al. | 600/453 |
| 2010/0286532 A1 | 11/2010 | Farringdon et al. | |
| 2010/0306388 A1* | 12/2010 | Newville | 709/227 |
| 2011/0161136 A1* | 6/2011 | Faith et al. | 705/7.29 |
| 2011/0237274 A1* | 9/2011 | Wong et al. | 455/456.1 |

OTHER PUBLICATIONS

Michahelles et al.; "Less Contact: Heart-Rate Detection Without Even Touching the User"; Eighth International Symposium on Wearable Computers; bearing a date of 2004; pp. 1-4; vol. 1; located at http://72.52.208.92/~gbpprorg/mil/cavity/iswc04_radar.pdf.

PCT International Search Report; International App. No. PCT/US12/35386; Aug. 13, 2012; pp. 1-3.

* cited by examiner

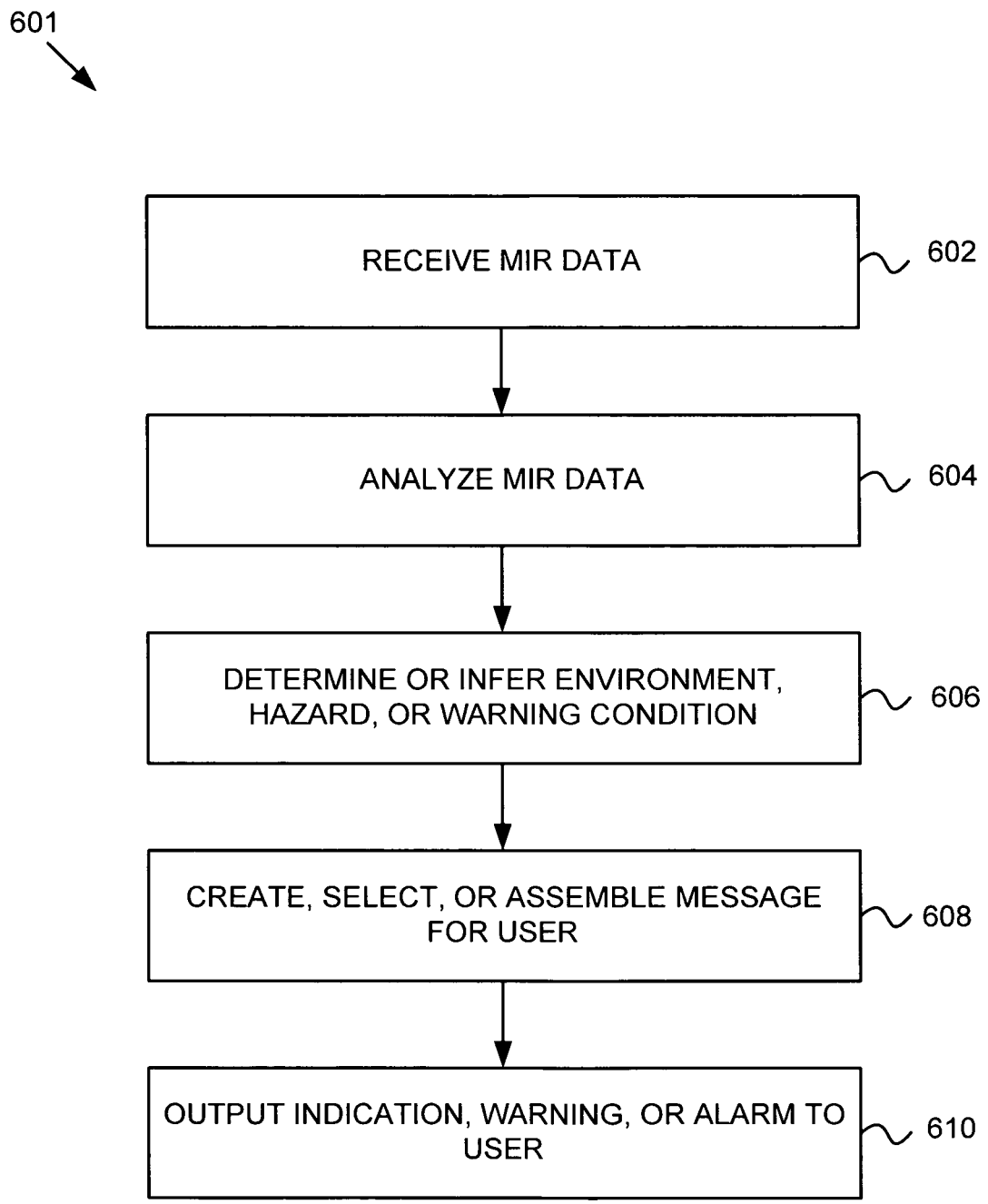

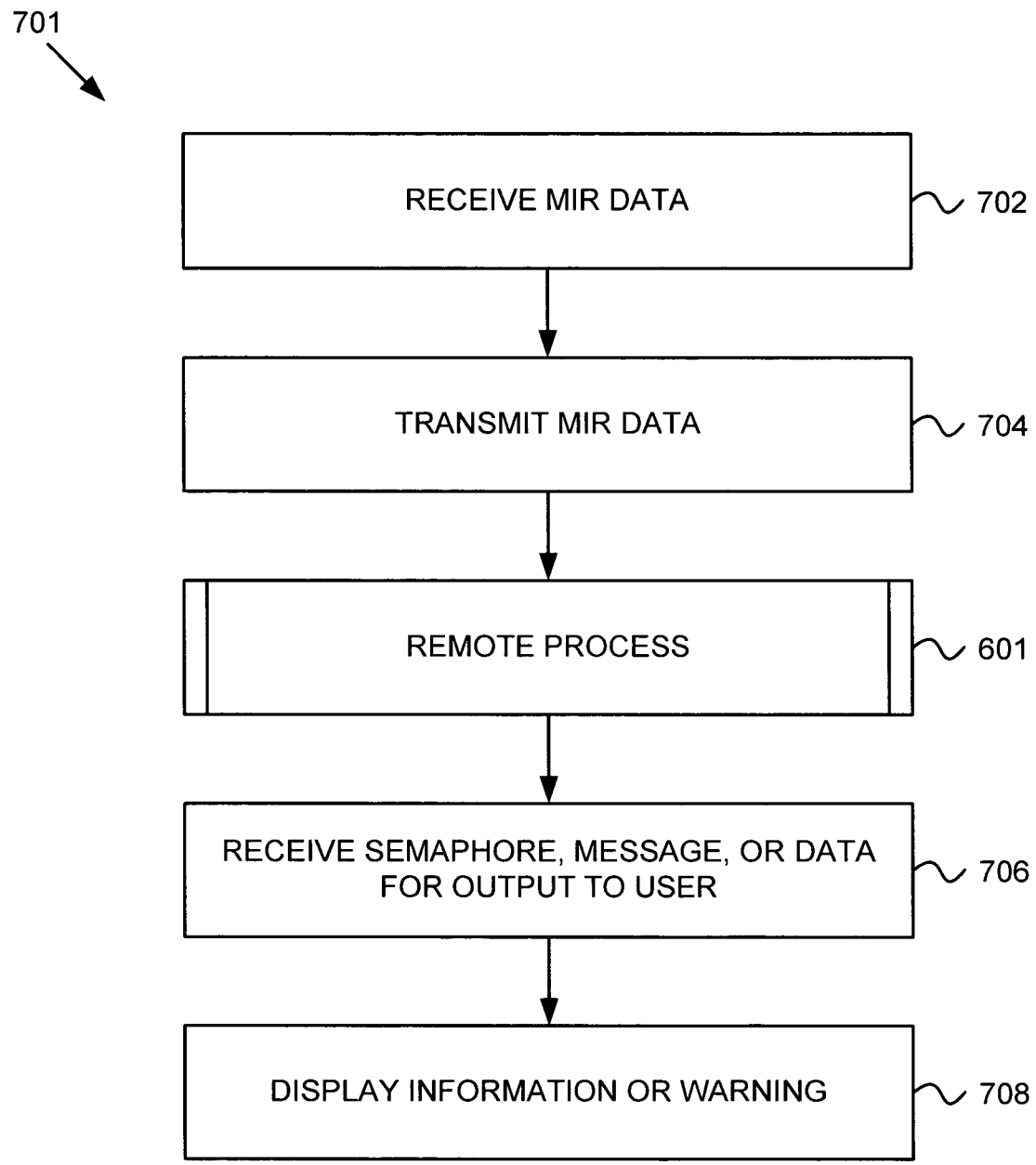

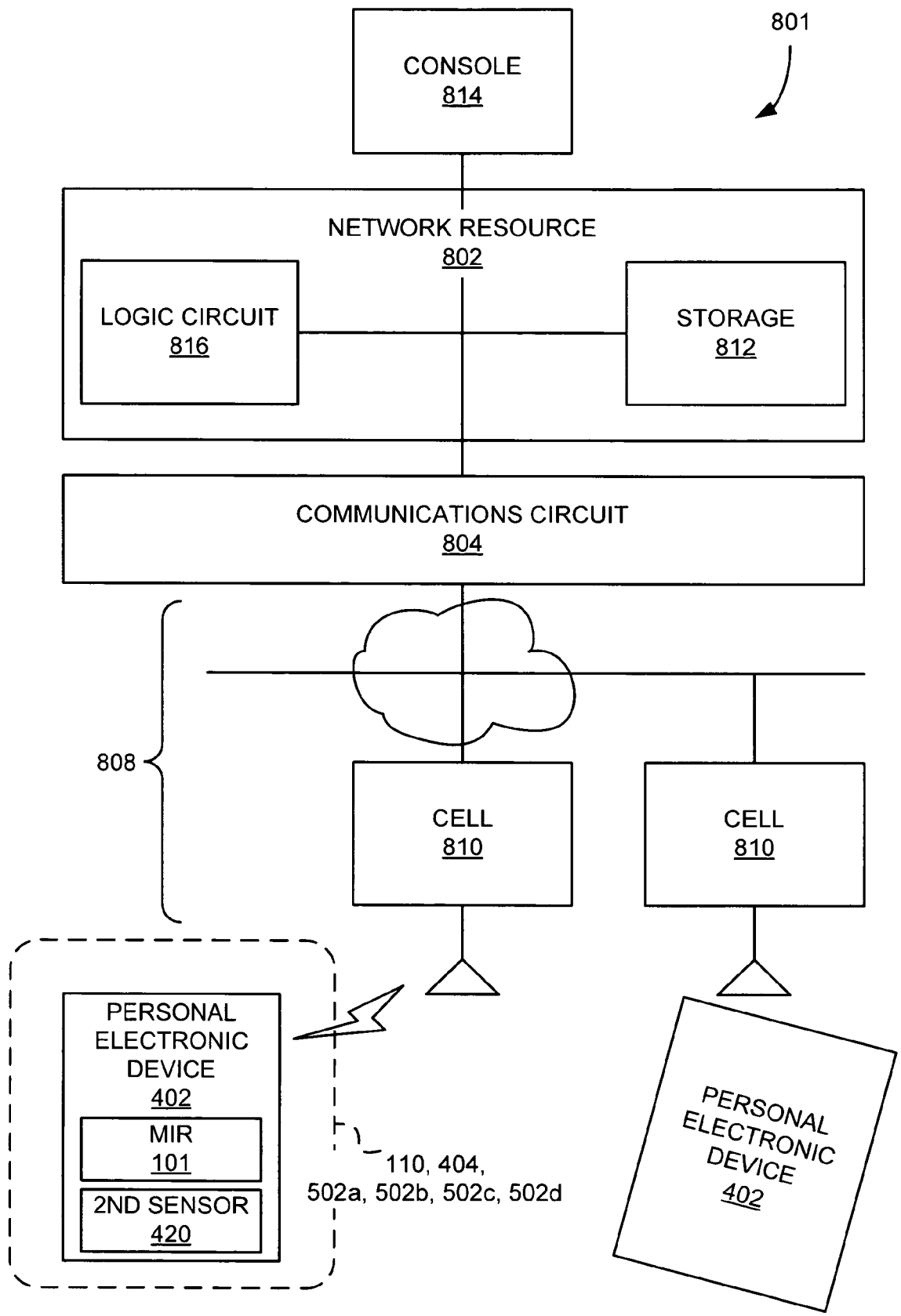

PERSONAL ELECTRONIC DEVICE PROVIDING ENHANCED USER ENVIRONMENTAL AWARENESS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of the following U.S. patent applications:

Application Ser. No. 13/136,405, entitled ADAPTIVE CONTROL OF A PERSONAL ELECTRONIC DEVICE RESPONSIVE TO A MICRO-IMPULSE RADAR, naming Roderick A. Hyde, Jordin T. Kare, and Lowell L. Wood, Jr. as inventors, filed on Jul. 29, 2011, which is filed on the same date as the instant application, or is an application of which a currently co-pending application is entitled to the benefit of the filing date;

Application Ser. No. 13/068,049, entitled PERSONAL ELECTRONIC DEVICE WITH A MICRO-IMPULSE RADAR, naming Roderick A. Hyde, Jordin T. Kare, and Lowell L. Wood, Jr. as inventors, filed on Apr. 29, 2011, which is currently co-pending, or is an application of which a currently co-pending application is entitled to the benefit of the filing date; and Application Ser. No. 13/068,051, entitled NETWORK AND PERSONAL ELECTRONIC DEVICES OPERATIVELY COUPLED TO MICRO-IMPULSE RADARS, naming Roderick A. Hyde, Jordin T. Kare, and Lowell L. Wood, Jr. as inventors, filed on Apr. 29, 2011, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

According to an embodiment, a device can include a personal electronic device including a logic circuit and a user interface and at least one micro-impulse radar (MIR) operatively coupled to the logic circuit and configured to probe one or more regions near the personal electronic device. The logic circuit can be configured to receive or generate MIR data including information about the probed one or more regions and, in cooperation with the user interface, at least conditionally provide information about the one or more regions to a user.

According to an embodiment, a method includes operating a MIR operatively coupled to a personal electronic device to produce MIR data and at least conditionally outputting user-perceptible data responsive to the micro-impulse radar data. For example, this can be used to increase the user's awareness of his or her environment.

According to an embodiment, a non-transitory computer-readable medium can carry computer instructions configured to cause a personal electronic device to operate a MIR operatively coupled to a personal electronic device to produce MIR data and at least conditionally output user-perceptible data responsive to the MIR data.

According to an embodiment, a system can include a network resource configured to receive MIR data from one or more personal electronic devices and communications circuitry configured to operatively couple one or more personal electronic devices to the network resource, each personal electronic device being operatively coupled to at least one MIR, and each personal electronic device being configured to transmit the MIR data to the network resource. The network resource can include a logic circuit configured to analyze the MIR data from the one or more personal electronic devices and perform one or more logical operations responsive to the MIR data.

According to an embodiment, a method for determining an environment of a personal electronic device can include receiving MIR data from one or more personal electronic devices, analyzing the MIR data, and performing one or more logical operations responsive to the MIR data.

According to an embodiment, a non-transitory computer-readable medium can carry computer instructions configured to cause a network resource to receive MIR data from one or more personal electronic devices, analyze the MIR data, and perform one or more logical operations responsive to the MIR data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 6 is a flow chart showing a method 601 for at least conditionally outputting user-perceptible data on a personal electronic device responsive to MIR data for increasing a user's awareness of his or her surroundings, according to an embodiment.

FIG. 7 is a flow chart showing a method 701 for determining an environment, hazard, or warning condition for a user of a personal electronic device using a remote resource to process MIR data, according to an embodiment.

FIG. 8 is a block diagram of a system including a network resource configured to be operatively coupled to one or more personal electronic devices including MIRs, according to an embodiment.

DETAILED DESCRIPTION

Figure 1:
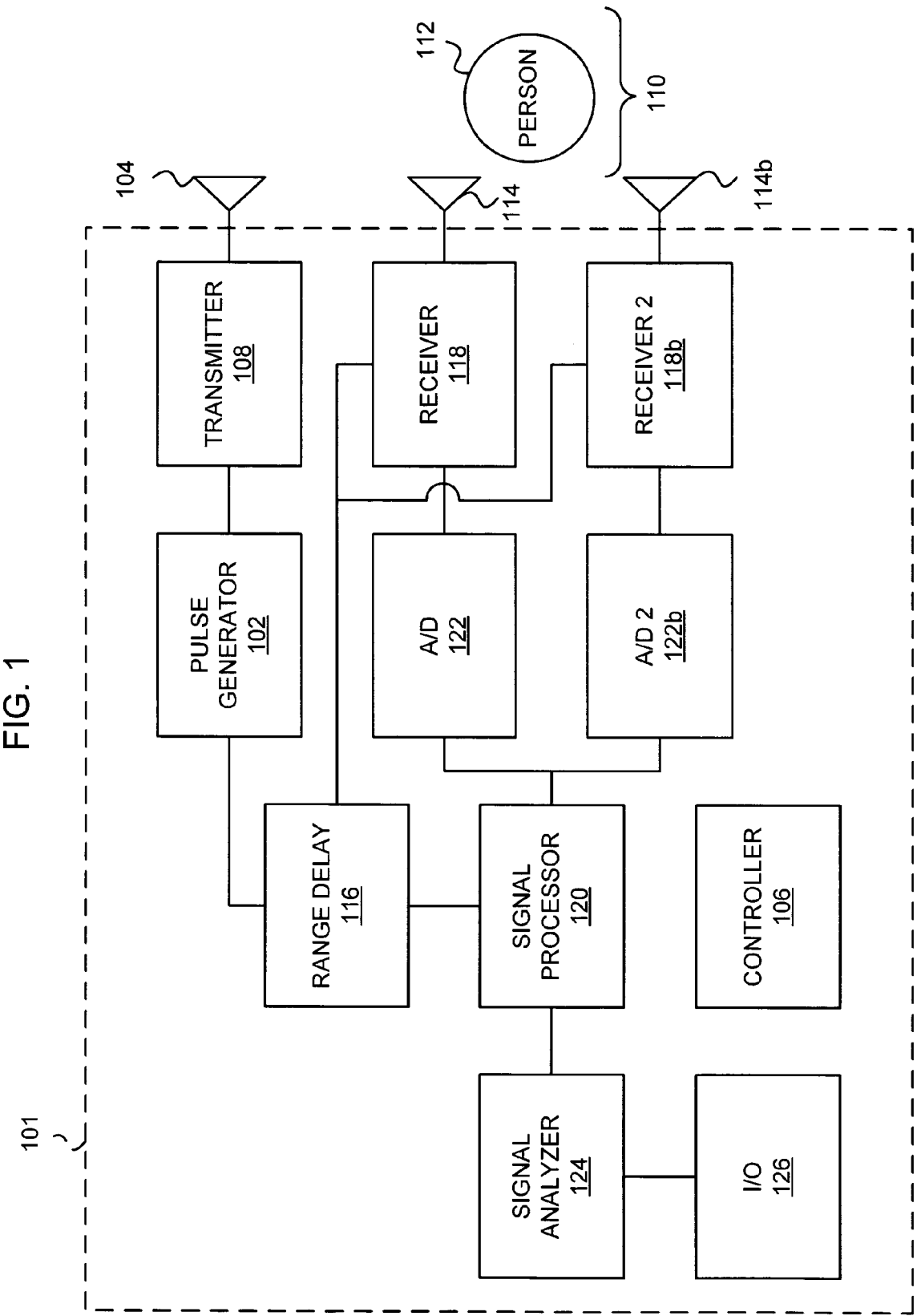
FIG. 1 is a simplified block diagram of a micro-impulse radar (MIR), according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here.

FIG. 1 is a simplified block diagram of a micro-impulse radar (MIR) 101, according to an embodiment. A pulse generator 102 is configured to output a relatively short voltage pulse that is applied to a transmit antenna 104. A typical transmitted pulse width can be between about two hundred picoseconds and about 5 nanoseconds, for example. The voltage pulse can be conditioned and amplified (or attenuated) for output by a transmitter 108. For example, the transmitter 108 can transmit the voltage pulse or can further condition the pulse, such as by differentiating a leading and/or trailing edge to produce a short sub-nanosecond transmitted pulses. The voltage pulse is typically not modulated onto a carrier frequency. Rather, the voltage pulse transmission spectrum is the frequency domain transform of the emitted pulse. The MIR 101 can probe a region 110 by emitting a series of spaced voltage pulses. For example, the series of voltage pulses can be spaced between about 100 nanoseconds and 100 microseconds apart. Typically, the pulse generator 102 emits the voltage pulses with non-uniform spacing such as random or pseudo-random spacing, although constant spacing can be used if interference or compliance is not a concern. Spacing between the series of voltage pulses can be varied responsive to detection of one or more persons 112 in the region 110. For example, the spacing between pulses can be relatively large when a person 112 is not detected in the region 110. Spacing between pulses can be decreased (responsive to one or more commands from a controller 106) when a person 112 is detected in the region 110. For example, the decreased time between pulses can result in faster MIR data generation for purposes of more quickly determining information about one or more persons 112 in the region 110. The emitted series of voltage pulses can be characterized by spectral components having high penetration that can pass through a range of materials and geometries in the region 110.

An object 112 (such as a person) in the probed region 110 can selectively reflect, refract, absorb, and/or otherwise scatter the emitted pulses. A return signal including a reflected, refracted, absorbed, and/or otherwise scattered signal can be received by a receive antenna 114. Optionally, the receive antenna 114 and transmit antenna 104 can be combined into a single antenna. In a single antenna embodiment, a filter (not shown) can be used to separate the return signal from the emitted pulse.

A probed region 110 can be defined according to an angular extent and distance from the transmit antenna 104 and the receive antenna 114. Distance can be determined by a range delay 116 configured to trigger a receiver 118 operatively coupled to the receive antenna 114. For example, the receiver 118 can include a voltage detector such as a capture-and-hold capacitor or network. The range delay corresponds to distance into the region 110. Range delay can be modulated to capture information corresponding to different distances.

A signal processor 120 can be configured to receive detection signals or data from the receiver 118 and the analog to digital converter 122, and by correlating range delay to the detection signal, extract data corresponding to the probed region 110 including the object 112.

Optionally, the MIR 101 can include a second receive antenna 114b. The second receive antenna can be operatively coupled to a second receiver 118b coupled to an output of the range delay 116 or a separate range delay (not shown) configured to provide a delay selected for a depth into the region 110. The signal processor 120 can further receive output from a second A/D converter 122b operatively coupled to the second receiver 118b.

The signal processor 120 can be configured to compare detection signals received by the antennas 114, 114b. For example, the signal processor 120 can search for common signal characteristics such as similar reflected static signal strength or spectrum, similar (or corresponding) Doppler shift, and/or common periodic motion components, and compare the respective range delays corresponding to detection by the respective antennas 114, 114b. Signals sharing one or more characteristics can be correlated to triangulate to a location of one or more objects 112 in the region 110 relative to known locations of the antennas 114, 114b. The triangulated locations can be output as computed ranges of angle or computed ranges of extent.

For example, a first signal corresponding to a reflected pulse received by an antenna element 114 can be digitized by an analog-to-digital converter (A/D) 122 to form a first digitized waveform. A second signal corresponding to the reflected pulse received by a second antenna element 114b can similarly be digitized by an A/D 122b (or alternatively by the same A/D converter 122) to form a second digitized waveform. The signal processor 120 can compare the first and second digitized waveforms and deduce angular information from the first and second digitized waveforms and known geometry of the first and second antenna elements.

A second pulse can be received at a second range delay 116 value and can be similarly signal processed to produce a second set of angular information that maps a second surface at a different distance. Depth within a given range delay can be inferred from a strength of the reflected signal. A greater number of signals can be combined to provide additional depth information. A series of pulses can be combined to form a time series of signals corresponding to the object 112 that includes movement information of the object 112 through the region 110. The object 112 described herein can include one or more persons.

The signal processor 120 outputs MIR data. The MIR data can include object location information, object shape information, object velocity information, information about inclusion of high density and/or conductive objects such as jewelry, cell phones, glasses including metal, etc., and physiological information related to periodic motion. The MIR data can include spatial information, time-domain motion information, and/or frequency domain information. Optionally, the MIR data can be output in the form of an image. MIR data in the form of an image can include a surface slice made of pixels or a volume made of voxels. Optionally, the image can include vector information.

The MIR data from the signal processor 120 is output to a signal analyzer 124. The signal analyzer 124 can be integrated with the signal processor 120 and/or can be included in the same MIR 101, as shown. Alternatively, the signal processor 120 can output MIR data through an interface to a signal analyzer 124 included in an apparatus separate from the MIR 101.

A signal analyzer 124 can be configured to extract desired information from MIR data received from the signal processor 120. Data corresponding to the extracted information can be saved in a memory for access by a data interface 126 or can be pushed out the data interface 126.

The signal analyzer 124 can be configured to determine the presence of a person 112 in the region 110. For example, MIR data from the signal processor can include data having a static spectrum at a location in the region 110, and a periodic motion spectrum corresponding to the location characteristic of a human physiological process (e.g. heartbeat and/or breathing). From the correspondence of such MIR data, it can be deduced that a person 112 is at the location in the region 110. The signal analyzer 124 can be configured to determine a number of persons 112 in the region 110. The signal analyzer 124 can be configured to determine the size of a person and/or relative size of anatomical features of a person 112 in the region 110. The signal analyzer 124 can be configured to determine the presence of an animal 112 in the region 110. The signal analyzer 124 can be configured to determine movement and/or speed of movement of a person 112 through the region 110. The signal analyzer 124 can be configured to determine or infer the orientation of a person 112 such as the direction a person is facing relative to the region 110. The signal analyzer 124 can be configured to determine one or more physiological aspects of a person 112 in the region 110. The signal analyzer 124 can determine presence of a personal appliance such as a cell phone, PDA, etc. and/or presence of metalized objects such as credit cards, smart cards, access cards, etc. The signal analyzer 124 can infer the gender and age of one or more persons based on returned MIR data. For example, male bodies can generally be characterized by higher mass density than female bodies, and thus can be characterized by somewhat greater reflectivity at a given range. Adult female bodies can exhibit relatively greater harmonic motion ("jiggle") responsive to movements, and can thus be correlated to harmonic spectra characteristics. Older persons generally move differently than younger persons, allowing an age inference based on detected movement in the region 110.

By determination of one or more such aspects and/or combinations of aspects, the signal analyzer 124 can determine a demographic of one or more persons 112 in the region 110.

For example, MIR data can include movement corresponding to the beating heart of one or more persons 112 in the region 110. The signal analyzer 124 can filter the MIR data to remove information not corresponding to a range of heart rates, and determine one or more heart rates by comparing movement of the heart surface to the MIR signal rate. The one or more heart rates can further be characterized according to a confidence factor, depending on statistical certainty regarding the determined one or more heart rates.

Similarly, the signal analyzer 124 can determine one or more respiration rates by measuring movement corresponding to the chest or diaphragm of one or more persons 112. The signal analyzer 124 can determine movement, a direction of movement, and/or a rate of movement of one or more persons 112 in the region 110. Operation of the signal analyzer 124 is described in greater detail below by reference to FIGS. 2 and 3.

An electronic controller 106 can be operatively coupled to the pulse generator 102, the transmitter 108, the range delay 116, the receiver 118, the analog-to-digital converter 122, the signal processor 120, and/or the signal analyzer 124 to control the operation of the components of the MIR 101. For embodiments so equipped, the electronic controller 106 can also be operatively coupled to the second receiver 118b, and the second analog-to-digital converter 122b. The data interface 126 can include a high speed interface configured to output data from the signal analyzer 124. Alternatively, for cases where signals are analyzed externally to the MIR, the data interface 126 can include a high speed interface configured to output MIR data from the signal processor 120. The data interface 126 can include an interface to the controller 106. Optionally, the controller 106 can be interfaced to external systems via a separate interface (not shown).

Figure 2:
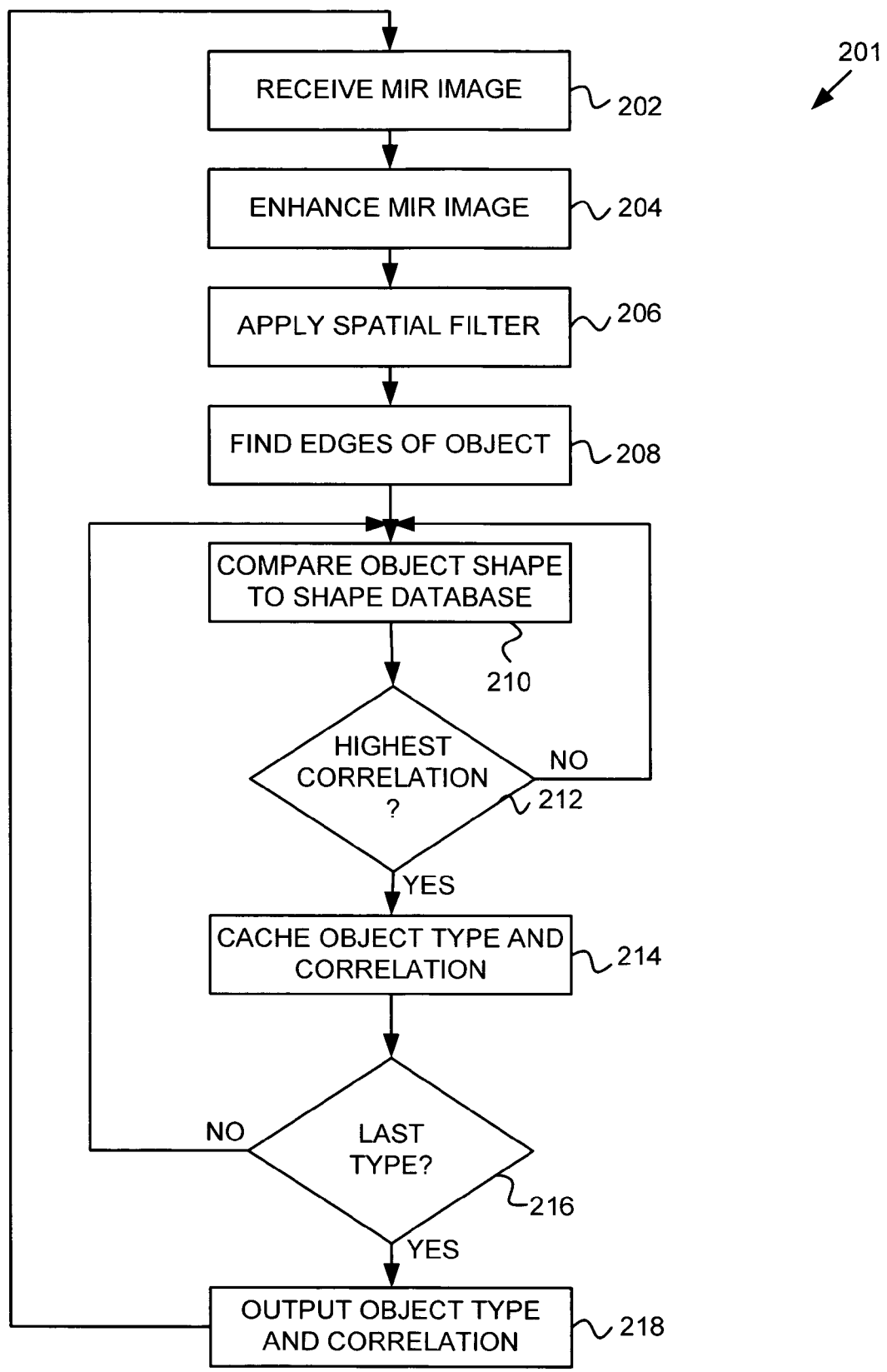
FIG. 2 is a flow chart showing an illustrative process for determining the presence of a person in a region with the MIR of FIG. 1, according to an embodiment.

FIG. 2 is a flow chart showing an illustrative process 201 for determining the presence of one or more persons 112 in the region 110 with the signal analyzer 124 of the MIR 101, according to an embodiment. Beginning with step 202, MIR data is received as described above in conjunction with FIG. 1. The MIR data can correspond to a plurality of probes of the region 110. Proceeding to optional step 204, the MIR data can be enhanced to facilitate processing. For example, grayscale data corresponding to static reflection strength as a function of triangulated position can be adjusted, compressed, quantized, and/or expanded to meet a desired average signal brightness and range. Additionally or alternatively, velocity information corresponding to Doppler shift, and/or frequency transform information corresponding to periodically varying velocity can similarly be adjusted, compressed, quantized, and/or expanded. Systematic, large scale variations in brightness can be balanced, such as to account for side-to-side variations in antenna coupling to the region. Contrast can be enhanced such as to amplify reflectance variations in the region.

Proceeding to optional step 206, a spatial filter can be applied. Application of a spatial filter can reduce processing time and/or capacity requirements for subsequent steps described below. The spatial filter may, for example, include a computed angle or computed extent filter configured to remove information corresponding to areas of contrast, velocity, or frequency component(s) having insufficient physical extent to be large enough to be an object of interest. The spatial filter may, for example, identify portions of the region 110 having sufficient physical extent to correspond to body parts or an entire body of a person 112, and remove features corresponding to smaller objects such as small animals, leaves of plants, or other clutter. According to an embodiment, the spatial filter can remove information corresponding to areas of contrast, velocity, or frequency component(s) having physical extent greater than a maximum angle or extent that is likely to correspond to a person or persons 112. In other embodiments, the spatial filter applied in step 206 can eliminate small, low contrast features, but retain small, high contrast features such as jewelry, since such body ornamentation can be useful in some subsequent processes. The step of applying the spatial filter 206 can further include removing background features from the MIR data. For example, a wall lying between an antenna 104, 114 and the region 110 can cast a shadow such as a line in every MIR signal. Removal of such constant features can reduce subsequent processing requirements.

Proceeding to optional step 208, an edge-finder can identify edges of objects 112 in the region 110. For example, a global threshold, local threshold, second derivative, or other algorithm can identify edge candidates. Object edges can be used, for example, to identify object shapes, and thus relieve subsequent processes from operating on grayscale data. Alternatively, step 208 can be omitted and the process of identifying objects can be performed on the grayscale MIR data.

Proceeding to step 210, processed data corresponding to the MIR data is compared to a database to determine a match. The object data received from step 202 (and optionally steps 204, 206, and/or 208) can be compared to corresponding data for known objects in a shape database. Step 210 can be performed on a grayscale signal, but for simplicity of description it will be assumed that optional step 208 was performed and matching is performed using object edges, velocity, and/or spectrum values. For example, the edge of an object 112 in the region 110 can include a line corresponding to the outline of the head and torso, cardiac spectrum, and movements characteristic of a young adult male. A first shape in the shape database can include the outline of the head and torso, cardiac spectrum, density, and movements characteristic of a young adult female and/or the head and torso outline, cardiac spectrum, density, and movements characteristic of a generic human. The differences between the MIR data and the shape database shape can be measured and characterized to derive a probability value. For example, a least-squares difference can be calculated.

Optionally, the object shape from the MIR data can be stepped across, magnified, and stepped up and down the shape database data to minimize a sum-of-squares difference between the MIR shape and the first shape in the shape database. The minimum difference corresponds to the probability value for the first shape.

Proceeding to step 212, if the probability value for the first shape is the best probability yet encountered, the process proceeds to step 214. For the first shape tested, the first probability value is the best probability yet encountered. If an earlier tested shape had a higher probability to the MIR data, the process loops back from step 212 to step 210 and the fit comparison is repeated for the next shape from the shape database.

In step 214, the object type for the compared shape from the shape database and the best probability value for the compared shape are temporarily stored for future comparison and/or output. For example, the compared shape from the shape database can be identified by metadata that is included in the database or embedded in the comparison data. Proceeding to step 216, the process either loops back to step 210 or proceeds to step 218, depending on whether a test is met. If the most recently compared shape is the last shape available for comparison, then the process proceeds to step 218. Optionally, if the most recently compared shape is the last shape that the process has time to compare (for example, if a new MIR data is received and/or if another process requires output data from the process 201) then the process proceeds to step 218. In step 218, the object type and the probability value is output. The process can then loop back to step 202 and the process 201 can be repeated.

Otherwise, the process 201 loops from step 216 back to step 210. Again, in step 210, the next comparison shape from a shape database is loaded. According to an embodiment, the comparison can proceed from the last tested shape in the shape database. In this way if the step 218 to 202 loop occurs more rapidly than all objects in the shape database can be compared, the process eventually works its way through the entire shape database. According to an embodiment, the shape database can include multiple copies of the same object at different orientations, distances, and positions within the region. This can be useful to reduce processing associated with stepping the MIR shape across the shape database shape and/or changing magnification.

The object type can include determination of a number of persons 112 in the region 110. For example, the shape database can include outlines, cardiac and/or respiration spectra, density, and movement characteristics for plural numbers of persons. According to embodiments, the shape library can include shapes not corresponding to persons. This can aid in identification of circumstances where no person 212 is in the region 210. Optionally, process 201 can be performed using plural video frames such as averaged video frames or a series of video frames. Optionally, steps 212, 214, and 216 can be replaced by a single decision step that compares the probability to a predetermined value and proceeds to step 218 if the probability meets the predetermined value. This can be useful, for example, in embodiments where simple presence or absence of a person 212 in the region 210 is sufficient information.

According to an embodiment, the signal analysis process 201 of FIG. 2 can be performed using conventional software running on a general-purpose microprocessor. Optionally, the process 201 can use various combinations of hardware, firmware, and software; and can include the use of a digital signal processor.

Figure 3:
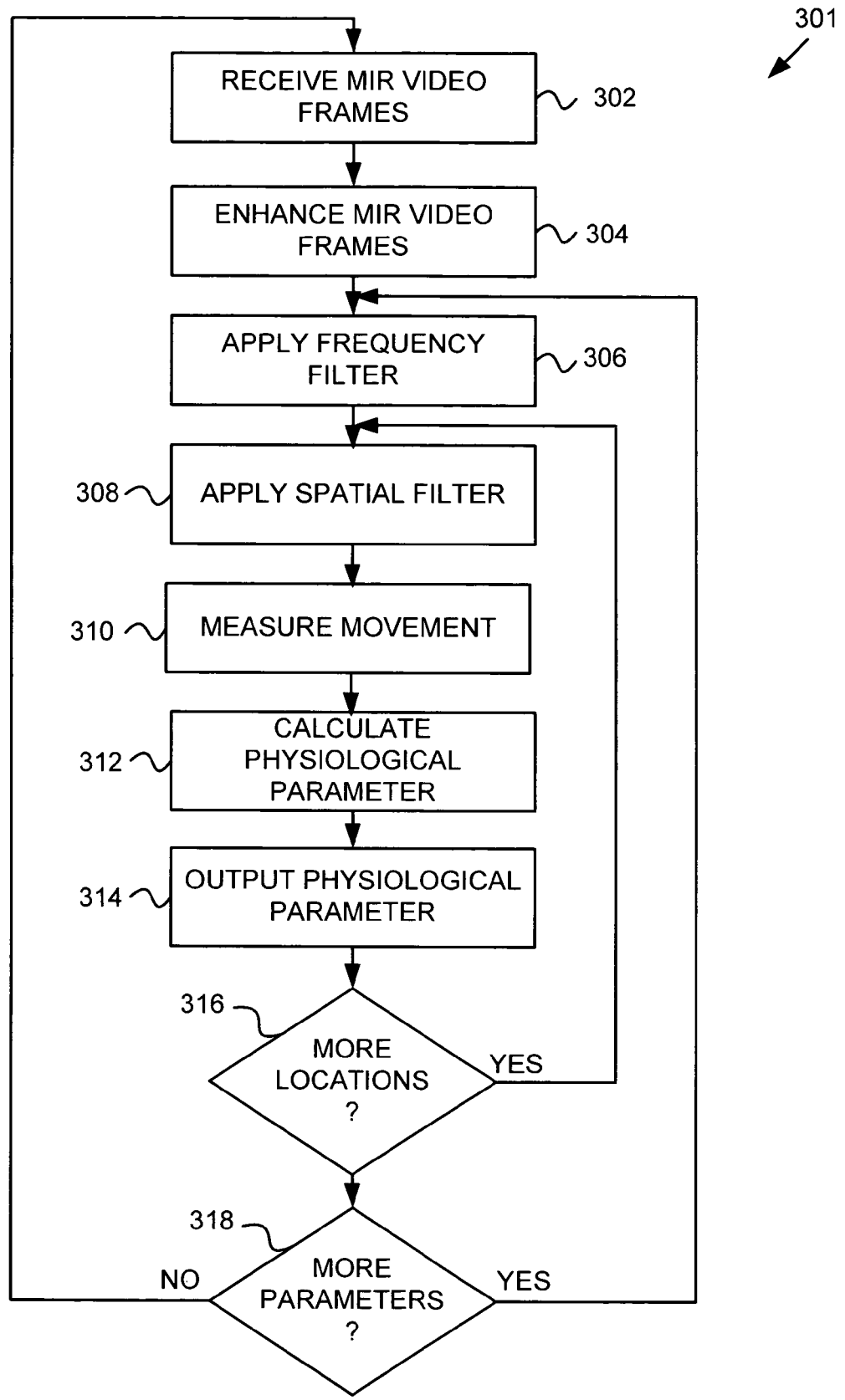
FIG. 3 is a flow chart showing an illustrative process for determining a physiological parameter of a person in a region with the MIR of FIG. 1, according to an embodiment.

FIG. 3 is a flow chart showing an illustrative process 301 for determining one or more particular physiological parameters of a person 112 in the region 110 with the signal analyzer 124 of the MIR 101, according to an embodiment. Optionally, the process 301 of FIG. 3 can be performed conditional to the results of another process such as the process 201 of FIG. 2. For example, if the process 201 determines that no person 112 is in the region 110, then it can be preferable to continue to repeat process 201 rather than execute process 301 in an attempt to extract one or more particular physiological parameters from a person that is not present.

Beginning with step 302, a series of MIR time series data is received. While the received time series data need not be purely sequential, the process 301 generally needs the time series data received in step 302 to have a temporal capture relationship appropriate for extracting time-based information. According to an embodiment, the MIR time series data can have a frame rate between about 16 frames per second and about 120 frames per second. Higher capture rate systems can benefit from depopulating frames, such as by dropping every other frame, to reduce data processing capacity requirements.

Proceeding to step 304, the MIR video frames can be enhanced in a manner akin to that described in conjunction with step 204 of FIG. 2. Optionally, step 304 can include averaging and/or smoothing across multiple MIR time series data. Proceeding to optional step 306, a frequency filter can be applied. The frequency filter can operate by comparing changes between MIR time series data to a reference frequency band for extracting a desired physical parameter. For example, if a desired physiological parameter is a heart rate, then it can be useful to apply a pass band for periodic movements having a frequency between about 20 cycles per minute and about 200 cycles per minute, since periodic motion beyond those limits is unlikely to be related to a human heart rate. Alternatively, step 304 can include a high pass filter that removes periodic motion below a predetermined limit, but retains higher frequency information that can be useful for determining atypical physiological parameters.

Proceeding to optional step 308, a spatial filter can be applied. The spatial filter may, for example, include a pass band filter configured to remove information corresponding to areas of contrast having insufficient physical extent to be large enough to be an object of interest, and remove information corresponding to areas too large to be an object of interest. The spatial filter may, for example, identify portions of the region 110 having sufficient physical extent to correspond to the heart, diaphragm, or chest of a person 112, and remove signal features corresponding to smaller or larger objects. The step of applying the spatial filter 308 can further include removing background features from the MIR data. For example, a wall between an antenna 104, 114 (114b) and the region 110 can cast a shadow such as a line in every instance of MIR data. Removal of such constant features can reduce subsequent processing requirements.

Proceeding to step 310, movement such as periodic movement in the MIR time series data is measured. For example, when a periodic motion is to be measured, a time-to-frequency domain transform can be performed on selected signal elements. For example, when a non-periodic motion such as translation or rotation is to be measured, a rate of movement of selected signal elements can be determined. Optionally, periodic and/or non-periodic motion can be measured in space vs. time. Arrhythmic movement features can be measured as spread in frequency domain bright points or can be determined as motion vs. time. Optionally, subsets of the selected signal elements can be analyzed for arrhythmic features. Optionally plural subsets of selected signal elements can be cross-correlated for periodic and/or arrhythmic features. Optionally, one or more motion phase relationships between plural subsets of selected signal features, between a subset of a selected signal feature and the signal feature, or between signal features can be determined.

For example, a person with a hiccup can be detected as a non-periodic or arrhythmic motion superimposed over periodic motion of a signal element corresponding to the diaphragm of the person.

Proceeding to step 312, a physiological parameter can be calculated. For example, MIR data can include data having a periodic motion spectrum corresponding to the location characteristic of a human physiological process (e.g. heartbeat and/or breathing). Step 312 can include determining one or more heart rates by comparing movement of the heart surface to the MIR signal rate. The one or more heart rates can further be characterized according to a confidence factor, depending on statistical certainty regarding the determined one or more heart rates. Similarly, step 312 can include determining one or more respiration rates by measuring movement corresponding to the chest or diaphragm of one or more persons.

Proceeding to step 314, the physiological parameter can be output. Proceeding to step 316, if there are more locations to measure, the process 301 can loop back to execute step 308. If there are not more locations to measure, the process can proceed to step 318. In step 318, if there are more physiological parameters to measure, the process 301 can loop back to execute step 306. If there are not more physiological parameters to measure, the process 301 can loop back to step 302, and the process 301 of FIG. 3 can be repeated.

Figure 4:
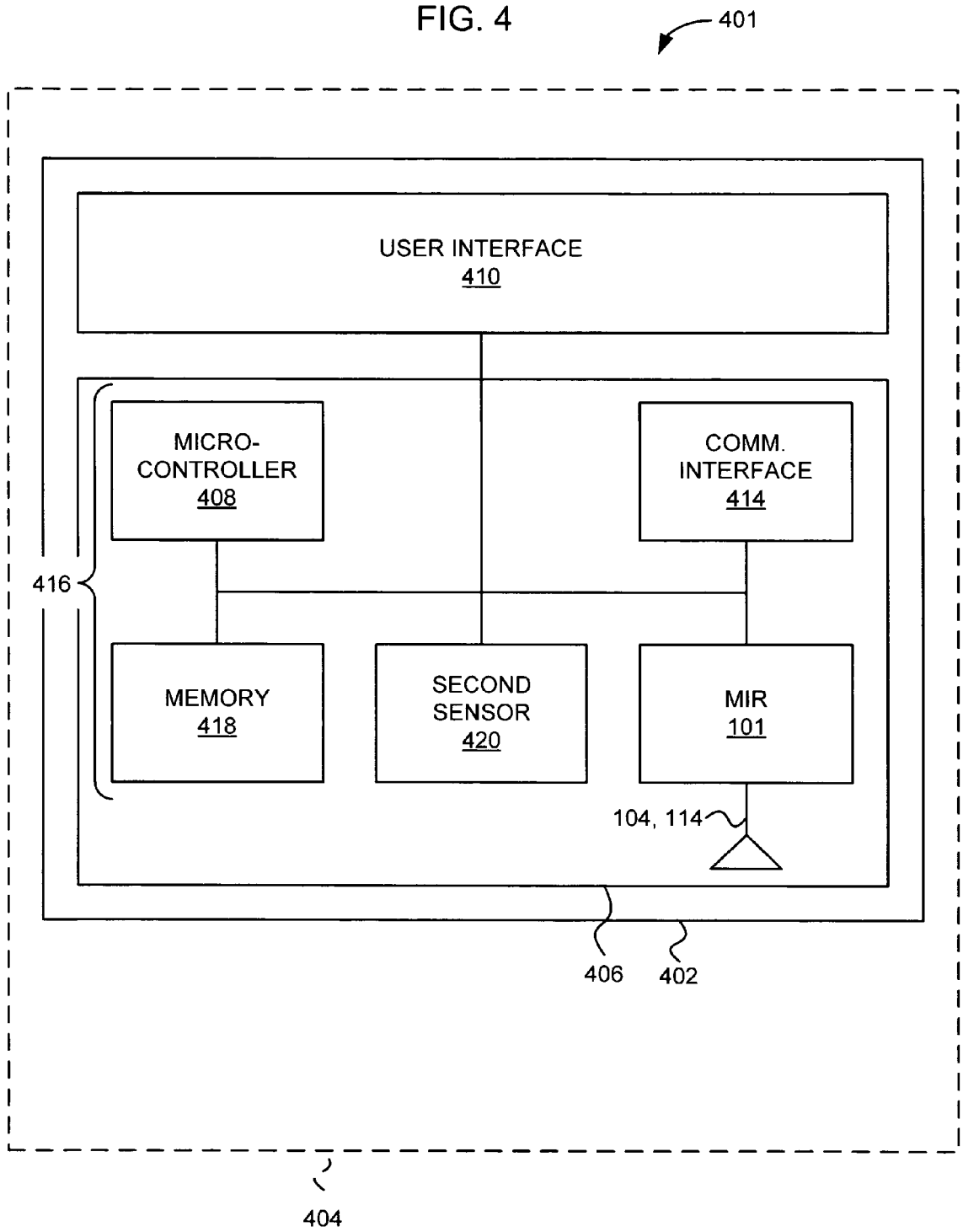
FIG. 4 is a block diagram of a personal electronic device including a micro-impulse radar, according to an embodiment.

FIG. 4 is a block diagram of a personal electronic device 401 including a MIR 101, according to an embodiment. The personal electronic device 402 can be a cellular phone, a smart phone, a personal data assistant, a pager, a tablet computer, a netbook, a notebook computer, or a combination thereof, for example. The device 401 can include a logic circuit 416, a user interface 410, and at least one MIR 101 operatively coupled to logic circuit 416 and the personal electronic device 402. The at least one MIR 101 can be configured to probe one or more regions 404 near the personal electronic device 402. The logic circuit 116 can be configured to receive or generate MIR data including information about the probed region(s) and, in cooperation with the user interface, at least conditionally provide information about the region(s) to a user. Accordingly, the personal electronic device 402 can be configured to output user perceptible data corresponding to the MIR data.

The MIR 101 can be operatively coupled to the personal electronic device 402 via an exposed interface. For example, the exposed interface can include a USB interface, a SIM card interface, a WiFi interface, a BlueTooth interface, a ZigBee interface, an infrared interface, or a proprietary interface.

Alternatively, at least a portion of the MIR 101 can be located inside the personal electronic device 402. The personal electronic device 402 can include at least one circuit board 406. At least a portion of the MIR 101 can be integrated with the circuit board(s) 406. The MIR 101 can include one or more antennas 104, 114 formed as electrical traces on the circuit board(s) 406. Optionally, the MIR 101 can include a pulse generator (see FIG. 1, 102) and a range delay (see FIG. 1, 116) embodied as operations of a microcontroller or microprocessor 408. Furthermore, the MIR 101 can include at least one receiver (see FIG. 1, 118) embodied as one or more capture-and-hold capacitors (not shown) on the circuit board(s) 406 operatively coupled to antenna(s) 104, 114. Alternatively, the capture-and-hold capacitor(s) can be integrated into the microcontroller or microprocessor 408. Optionally, the MIR 101 can also include a signal processor (see FIG. 1, 120) embodied as software or firmware running on the microcontroller or microprocessor 408.

Optionally, the MIR 101 can be configured in a bistatic architecture with at least one component of the MIR 101 being in the personal electronic device 402, and at least one other component of the MIR being located separately. For example, the personal electronic device can include at least one transmitter (see FIG. 1, 108) or at least one receiver component (see FIG. 1, 118) of the MIR 101. Alternatively, the MIR 101 can be made according to a monostatic architecture, with substantially the entire MIR being in the personal electronic device 402.

The personal electronic device 402 can include logic circuitry 416 operatively coupled to the MIR 101 and configured to analyze MIR data from the MIR 101. The logic circuitry 416 can include the microcontroller or microprocessor 408, memory 418, and/or other related components. The MIR 101 can be configured to detect and provide raw data to the logic circuit 116. The logic circuit 116 can be configured to perform signal processing on the raw data to produce the MIR data. Alternatively, the MIR can include a signal processor (not shown) configured to convert detected raw data to the MIR data, and the MIR 101 can be configured to output the MIR data to the logic circuit 116.

As indicated above, the personal electronic device 402 can include a user interface 410. The user interface 410 can include a display, or alternatively, one or more of a haptic or audio output device. The personal electronic device 402 can output user perceptible data on the user interface 410 corresponding to MIR data from the MIR 101. The personal electronic device 402 can be configured to output the user perceptible data as a minimally-processed representation of MIR data from the MIR 101 or as a processed representation of MIR data from the MIR 101. For example, the user perceptible data can include a display indicating the location of objects 412 imaged by the MIR 101 in association with a map.

Figure 5:
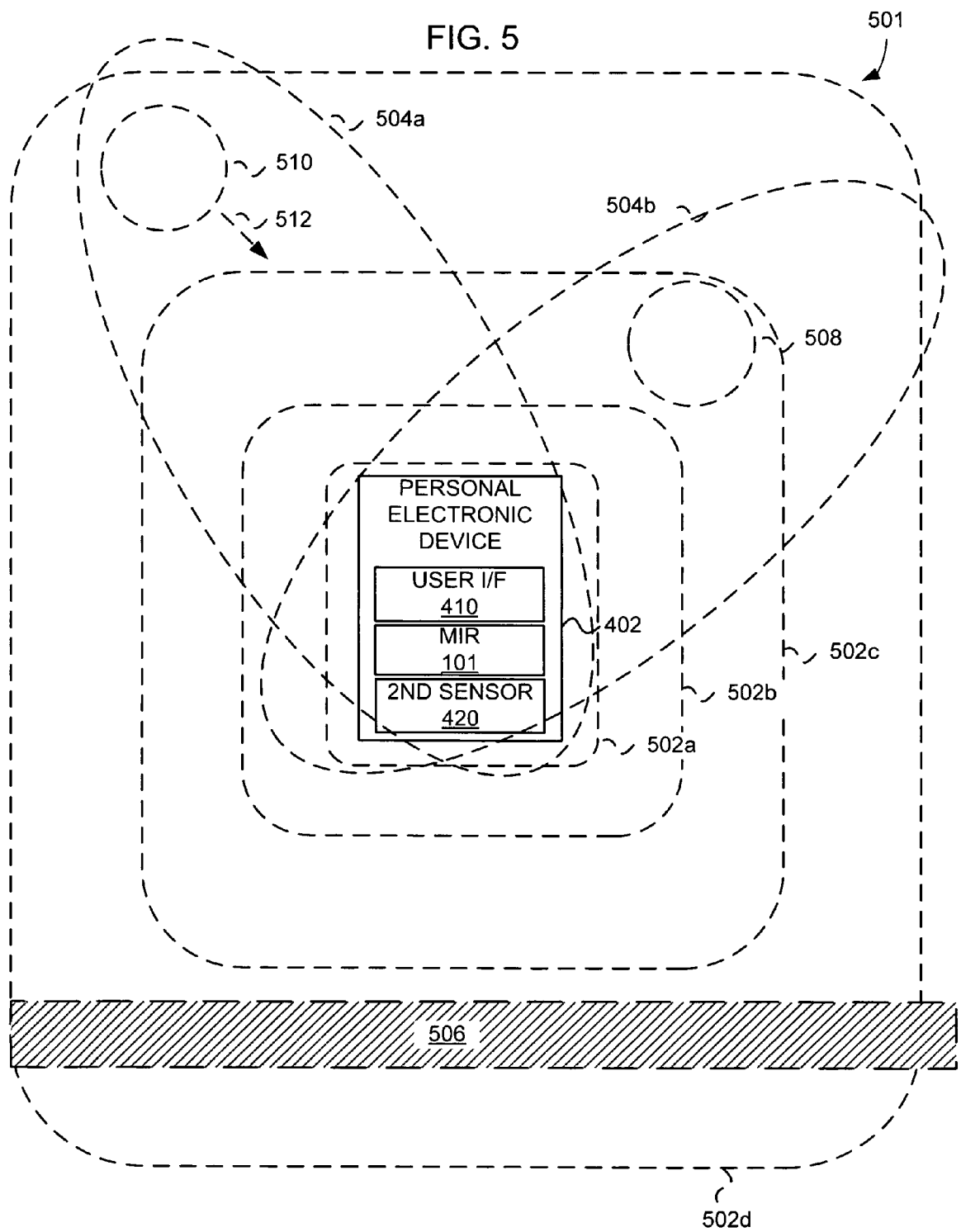
FIG. 5 is a diagram illustrating a plurality of regions and directions that can be probed by the MIR, according to an embodiment.

FIG. 5 is a diagram 501 illustrating a plurality of regions 502a, 502b, 502c, 502d and directions 504a, 504b that can be probed by the MIR, according to an embodiment. The regions and directions 502a, 502b, 502c, 502d, 504a, 504b are not depicted to scale, but rather are intended to indicate a range of distances. According to an embodiment, for example, the region 502d can extend several tens of feet from the personal electronic device 401 and the MIR 101. The one or more regions 502a, 502b, 502c, 502d near the personal electronic device 402 can correspond to one or more regions probed by the micro-impulse radar 101. A personal electronic device 402 can be operatively coupled to a MIR 101 configured to probe a plurality of regions 502a, 502b, 502c, 502d in the vicinity of the personal electronic device 402. As described above, the MIR 101 can be located inside the personal electronic device 402. The plurality of regions 502a, 502b, 502c, 502d can each be defined by a respective border. While the embodiment 501 shows two-dimensional projections of the regions 502a, 502b, 502c, 502d; the regions 502a, 502b, 502c, 502d may typically be three dimensional. The borders of the regions can be regular and symmetrical in their respective locations relative to the personal electronic device 402 and one another, or can be described by asymmetrical and/or irregular edges be symmetrically located away from the personal electronic device. The regions 502a, 502b, 502c, 502d may, as indicated, correspond to a series of subsets of one another, wherein region 502b includes all of 502a, region 502c includes all of regions 502a and 502b, and region 502d includes all of 502a, 502b, and 502c. Alternatively, some of the regions can exclude other regions nearer the personal electronic device 402.

The regions 502a, 502b, 502c, 502d can be selected by choosing one or more range delays during which reflections from probe pulses are received (see FIG. 1 and corresponding description) such that reflections returning from objects within a selected region are captured, but reflections from one or more other regions are not captured. Additionally or alternatively, the regions 502a, 502b, 502c, 502d can be selected by choosing a MIR 101 probe pulse power and/or a MIR probe pulse spectral content. MIR probe pulse spectral content can be selected by selecting from among a plurality of probe pulse output antennas, for example. Additionally or alternatively, the regions 502a, 502b, 502c, 502d can be selected by choosing a MIR 101 range delay. For example, a longer range delay can cause the MIR receiver to receive probe pulse responses from more distant regions 502c and/or 502d. A shorter range delay can cause the MIR receiver to receive probe pulse responses from nearer regions 502a and/or 502b.

The MIR 101 can be configured to probe one or more selected subsets of the one or more regions 502a, 502b, 502c, 502d and/or one or more selected directions 504a, 504b from the MIR 101. For example, the MIR 101 can use a probe antenna and/or receiving antenna selected to provide directional selectivity to detect objects within selected directions 504a, 504b relative to the personal electronic device 402. The one or more regions 502a, 502b, 502c, 502d near the personal electronic device correspond to one or more regions not visible from the personal electronic device 402. For example a wall 506, such as a briefcase wall, vehicle body, etc., can be positioned relative to the personal electronic device 402. A region 502d can include a region separated from the personal electronic device 402 by the wall 506. The portion of the region 502d separated from the personal electronic device 402 by the wall 506 can also be not visible to a user 112 of the personal electronic device. Additionally or alternatively, the portion of the region 502d separated from the personal electronic device 402 by the wall 506 can be not visible from the personal electronic device 402 and/or can correspond one or more regions along a predicted route of the personal electronic device (and/or the user 112).

According to embodiments, the personal electronic device 402 can be configured to improve a user's awareness of areas and objects around the user and the personal electronic device 402. For example, a user may be intent on text messaging and not be paying attention to his or her surroundings. Similarly, the user may be in a dark area or another area where it is difficult to see his or her surroundings. According to another embodiment, a user may be sight impaired or may otherwise have a diminished capacity to be aware of his or her environment. Embodiments are directed to improving the user's awareness of his or her surroundings and/or to alerting the user of hazards.

Referring to FIGS. 4 and 5, one or more regions 502a, 502b, 502c, 502d near the personal electronic device 402 can correspond to one or more possible locations of a person, animal, or other object 508, 510 proximate to the personal electronic device 402. The logic circuit 416 can be configured to determine or infer, from the MIR data, an environment of the personal electronic device 402. The personal electronic device 402 can output an indication of objects 508 in the one or more regions probed by the MIR. The indication of objects 508 can include one or more locations of objects 508, 510.

The user interface 410 of the personal electronic device 402 can include a display. The location(s) of object(s) can be displayed in association with a map. For example, the map can include a schematic representation, a photograph, a photo-realistic representation, a birds-eye view, a street view, a representation including a fixed reference frame relative to the personal electronic device, and/or a representation including a fixed reference frame relative to an environment around the personal electronic device 402. The indication of objects 508, 510 can include a speed of an object, a velocity of an object, a direction of movement of an object, a size of an object, a type of an object, or a list of one or more objects.

The indication of objects can include a warning about one or more objects 508, 510. The logic circuit 416 can be configured to analyze the MIR data. The logic circuit 416 can be configured to determine, for example based upon the analysis of the MIR data, whether to output data to the user responsive to the analysis of the MIR data. For example, the logic circuit 416 can be configured to determine whether to warn the user of a hazard condition responsive to the analysis of the MIR data.

The logic circuit 416 can be configured to determine one or more MIR 101 operating parameters responsive to the analysis of the MIR data. For example, the logic circuit 416 can be configured to determine or infer if the personal electronic device 402 has a probability of being outdoors, and select a high probe power for the MIR 101 responsive to determining or inferring that the personal electronic device 402 has a probability of being outdoors. Similarly, the logic circuit 416 can be configured to determine or infer if the personal electronic device 402 has a probability of being indoors, and select a low probe power for the MIR 101 responsive to determining or inferring that the personal electronic device 402 has a probability of being indoors.

One or more regions 502a, 502b, 502c, 502d, 504a, 504b can include one or more alarm zones. The personal electronic device 402 can be configured to warn a user of a presence of an object 508, 510 within the one or more alarm zones. For example, for a non-moving or other non-hazardous object 508 the region 502b can be set as an alarm zone. Thus, the presence of the object 508 within the region 502c but outside of the alarm zone 502b can be permitted without outputting a warning to the user. Alternatively, for a moving or otherwise hazardous object 510, the region 502d and/or 504a can be set as an alarm zone. The hazard can be determined, for example, as a function of a speed of motion or direction of motion 512. For example, if the object 510 is a moving motor vehicle, it can be desirable to warn the user of the approaching motor vehicle even when it is at a relatively far distance, outside of the region 502c but inside the region 502d.

The personal electronic device 402 can be configured to inform a user of an absence of an object within the one or more alarm zones. For example, on uneven terrain, if the user approaches a stairway or a precipice, the personal electronic device 402 can be configured to warn the user of the uneven terrain so that the user can avoid accidentally stepping off the stairway or precipice.

The personal electronic device 402 can be configured to inform a user of a characteristic of an object 508, 510 within the one or more alarm zones 502a, 502b, 502c, 502d, 504a, 504b. For example, the reported characteristic of the object can include position, speed, velocity, size, life-status, or type of object. Similarly, the personal electronic device 402 can be configured to warn a user of an intrusion of an object 508, 510 into or through the one or more alarm zones 502a, 502b, 502c, 502d, 504a, 504b. For example, after indicating entry of an object 508 into an alarm zone 502c, the personal electronic device 402 can cease the warning until or unless the object 508 next enters a closer alarm zone 502b.

Such capabilities can be used to improve the safety of the user. For example, the MIR can be configured to detect a moving vehicle, a moving object, an inanimate object, or void in the one or more alarm zones 502a, 502b, 502c, 502d, 504a, 504b, and the personal electronic device 402 can be configured to warn the user of an approaching moving vehicle or moving object 510, or of the user approaching the inanimate object or void 508. Similarly, the MIR can be configured to detect a person or animal 508 in the one or more alarm zones 502a, 502b, 502c, 502d, 504a, 504b, and the personal electronic device 402 can be configured to warn a user of a an approaching person or animal 508 or of the user approaching the person or the animal 508.

Optionally, the personal electronic device 402 can include a network communication interface 414 configured to output MIR data to a network resource (not shown). The network communication interface 404 can be configured to receive data determined responsive to MIR data from the MIR 101 from the network resource (not shown).

The personal electronic device 402 can further include a communication interface 414 operatively coupled to the logic circuit 416. The personal electronic device 402 configured to transmit MIR data to a remote resource (not shown), and receive from the remote resource data for output to the user. Thus, the remote resource (not shown) can perform some or all of the data analysis and determination of hazards presented by objects 508, 510.

As described above, the MIR data can include information related to a motion 512 of one or more objects 510 in the one or more regions 502d, 504a. The MIR data can additionally or alternatively include information related to one or more physiological parameters of one or more persons 508 in the one or more regions 502c. For example, the motion and/or physiological parameters can be extracted from spectral information in the MIR data corresponding to the one or more regions 502a, 502b, 502c, 502d, 504a, 504b.

The logic circuitry 416 can be operatively coupled to the user interface 410. The user interface 410 can receive user commands corresponding to one or more interactions between the MIR 110 and the logic circuitry 416. The interaction(s) can include a manual MIR 101 probe or automatic interaction(s). For example, automatic interaction(s) can include one or more of a schedule of probes, coupling to a computer program-driven control, and/or coupling to received external commands. Commands received through the user interface 410 can include selection of a MIR probe direction or selection of sensitivity to a subset of probe regions 404.

Optionally, the personal electronic device 402 can include one or more second sensors 420 operatively coupled to the logic circuitry 416. For example, the personal electronic device 402 can include logic circuitry 416 operatively coupled to the MIR 101 and/or the one or more second sensors 420. The logic circuitry 416 can be configured to select one or more operating parameters for the personal electronic device 402 responsive to data or signals from the one or more second sensors 420 and/or data from the MIR 101.

Optionally, the logic circuitry 416 can be configured to output data via the user interface 410 responsive to data or signals from the second sensor(s) 420 and/or responsive to data from the MIR 101. The second sensor(s) 420 can include one or more of a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a gaze sensor, a millimeter wave sensor, and/or a vibration sensor, for example.

The MIR 101 can be configured to operate with variable probe power. For example, the personal electronic device 402 can be configured to receive a probe power command through the user interface 410 and cause the MIR to operate with the selected probe power. Optionally, the logic circuit 416 can be configured to select a MIR probe power responsive to the MIR data, and cause the MIR to operate with the selected probe power. For example, the MIR can be configured to temporarily operate at very high probe power responsive to a user-selected or logic-selected power responsive to a hazard condition. As described above, one or more of a (second) sensor 420 or a communication interface 414 can be operatively coupled to the logic circuit 416. The probe power of the MIR can be configured to be selected responsive to data from the sensor 420 or communication interface 414.

FIG. 6 is a flow chart showing a method 601 for at least conditionally outputting user-perceptible data on a personal electronic device (e.g., for a personal electronic device 402 shown in FIGS. 4 and 5) responsive to MIR data, according to an embodiment. The method 601 can be used, for example, for increasing a user's awareness of his or her surroundings.

The personal electronic device can include a cellular phone, a smart phone, a personal data assistant, or a tablet computer, for example. At least a portion of the MIR can be located inside the personal electronic device. Operating the MIR can include operating a signal processor embodied as software or firmware running on a microcontroller or microprocessor shared by a personal electronic device logic circuit.

Optionally, for example, for embodiments where the MIR is not physically integrated into the personal electronic device, the method 601 can include transmitting the MIR data to the personal electronic device via an exposed interface (step not shown). Alternatively, as described in conjunction with FIG. 4, all or portions of the MIR can be integrated into the personal electronic device, and the personal electronic device can generate the MIR data from received probe pulses. The MIR can be made according to a monostatic or a bistatic architecture.

The method 601 can begin at step 602, wherein a MIR operatively coupled to a personal electronic device is operated to produce MIR data. Operating the MIR in step 602 can include outputting probe pulses to one or more regions (see FIG. 5, 502*a*, 502*b*, 502*c*, 502*d*) located peripheral to the personal electronic device. Next, the probe pulses, backscatter from the probe pulses, and/or radiation corresponding to the probe pulses and altered by objects in the one or more regions is/are received. The received probe pulses are detected at times synchronized to the output of the probe pulses, as described above in conjunction with FIG. 1. Step 602 can also include performing signal processing on the received and detected probe pulses to extract MIR data. For example, step 602 can include receiving raw data from the MIR, and performing signal processing on the raw data to produce the MIR data.

Optionally, for example, for embodiments where the MIR is not physically integrated into the personal electronic device, the method 601 can include transmitting the MIR data to the personal electronic device via an exposed interface (step not shown). Alternatively, as described in conjunction with FIG. 4, all or portions of the MIR can be integrated into the personal electronic device, and the personal electronic device can generate the MIR data from received probe pulses. The MIR can be made according to a monostatic or a bistatic architecture, as described above.

With reference to FIG. 5, operating the MIR can includes probing one or more selected subsets of the one or more regions 502*a*, 502*b*, 502*c*, 502*c*. Alternatively or additionally, operating the MIR can include probing one or more of a plurality of selected directions 504*a*, 504*b* from the MIR 101. The one or more regions 502*a*, 502*b*, 502*c*, 502*c* located peripheral to the personal electronic device 402 can correspond to one or more possible locations of objects or voids 508, 510. The one or more regions 502*a*, 502*b*, 502*c*, 502*c* located peripheral to the personal electronic device 402 can additionally or alternatively correspond one or more possible locations of a person or animal proximate to the personal electronic device.

Referring again to FIG. 6 in conjunction with FIG. 5, after operating the MIR in step 602, the process 601 can proceed to step 604, wherein the MIR data is analyzed. For example, step 604 can include determining the presence of objects 508, 510, a proximity of the objects 508, 510 to the personal electronic device 402, velocities of object(s) 508, 510, and types of objects 508, 510.

Step 604 can include analyzing the MIR data to extract information related to one or more of range, strength-of-response, direction, spectral characteristics, polarization, or Doppler characteristics.

Optionally, the method 601 can include receiving user input (not shown) via a user interface of the personal electronic device. Receiving user input can include a command to operate the MIR and/or selection of one or more operating modes or parameters. The selection(s) can include parameter (s) for the MIR, specification of one or more (logical) responses of the personal electronic device to MIR data, or one or more automatic interactions with the MIR. For example, automatic interaction(s) can include one or more of a schedule of probes, coupling to a computer program-driven control, or coupling to received external commands. MIR parameters can include selection of a MIR probe direction or a subset of the one or more regions. MIR parameters, operating modes, or automatic interactions can optionally include interactions with the one or more second sensors.

Proceeding to step 606, the logic circuit 416 (or optionally logic circuitry of a remote resource) determines an environment, and/or if a hazard or warning condition exists. Step 606 can include analyzing the MIR data to determine whether to output the user perceptible data. Step 606 can include determining whether the MIR data corresponds to a hazard condition. Step 606 can include comparing proximity of objects, types of objects, velocity of objects, and/or other properties determined in step 604 to hazard or warning criteria. For example, a user walking alone at night may set a warning criterion corresponding to the presence of any person within MIR range. Alternatively, a user walking on a crowded sidewalk may set a warning criterion corresponding to an approach of a motor vehicle in the direction of travel of the person. Various hazard or warning criteria are contemplated. Such criteria can be default criteria, automatically or dynamically determined criteria, and/or manually selected criteria. Optionally, the MIR data can include one or more physiological parameters of a person 508, 510 detected. The hazard or warning condition determined in step 606 can be made a function of the one or more physiological parameters.

Proceeding to step 608 a message to the user can be created, selected, and/or assembled. For example, step 608 can include formatting a bird's eye indication of object locations. In another example, step 608 can include selecting an alarm signal, for example to indicate an urgent condition.

Proceeding to step 610, a user-perceptible indication, warning, and/or alarm can be at least conditionally output to the user responsive to the analyzed MIR data and the determined hazard or warning condition. For example, at least conditionally outputting the user perceptible data can include displaying an indication of objects in one or more regions probed by the MIR. Displaying the indication of objects can include displaying locations of objects. The locations of objects can be displayed in association with a map as determined in step 608. The map can include one or more of a schematic representation, a photograph, a photo-realistic representation, a birds-eye view, a street view, a representation including a fixed reference frame relative to the personal electronic device, and/or a representation including a fixed reference frame relative to an environment around the personal electronic device.

Displaying the indication of objects can include displaying one or more of a speed of an object, a velocity of an object, a direction of movement of an object, a size of an object, a type of an object, and/or a list of one or more objects.

Displaying the indication of objects includes displaying a warning about one or more objects. In this case, "display" may be understood to include outputting an audible warning, for example. Outputting user-perceptible data can include outputting data as a minimally processed representation of the MIR data or can include outputting a processed representation of the MIR data.

As indicated above, the method 601 can optionally include receiving user input, for example, via a user interface of the personal electronic device. Receiving user input can include receiving a command to operate the MIR and/or receiving selection of one or more operating modes or parameters of the MIR. Receiving the user input can include selection of a micro-impulse probe direction or a subset of one or more probed regions. Receiving an operating parameter for the MIR can include receiving bandwidth, spectral shape, pulse width, pulse format, pulse schedule, polarization, range gate, beam width, beam direction, receiver sensitivity, signal processing parameters, transmitted energy, turning the MIR on, and/or turning the MIR off. Optionally, selecting one or more operating parameters of the MIR includes automatically selecting the one or more-operating parameters as a function of previously received micro-impulse radar data.

For example, automatic interaction(s) can include one or more of a schedule of probes, coupling to a computer program-driven control, or coupling to received external commands. MIR parameters can include selection of a MIR probe direction or a subset of the one or more regions. MIR parameters, operating modes, or automatic interactions can optionally include interactions with the one or more second sensors.

Optionally, analyzing the MIR data to determine or infer an environment of the personal electronic device in step 606 can include determining or inferring that the personal electronic device has a probability of being outdoors. Optionally, the method 601 can include a step (not shown) selecting a high probe power for the MIR responsive to being outdoors. Alternatively, analyzing the MIR data to determine or infer an environment of the personal electronic device can include determining or inferring that the personal electronic device has a probability of being indoors. Optionally, the method 601 can include a step (not shown) of selecting a low probe power for the MIR responsive to being indoors.

To summarize, step 602 can include operating a MIR to probe one or more alarm zones. At least conditionally outputting user-perceptible data in step 610 can include warning a user of a presence of an object or an absence of an object within the one or more alarm zones. At least conditionally outputting user-perceptible data in step 610 can includes informing a user of a characteristic of an object within the one or more alarm zone. A characteristic of the object can include one or more of position, speed, velocity, size, or object type, for example. At least conditionally outputting user-perceptible data can include warning a user of an intrusion of an object into or through the one or more alarm zones. For example, step 604 can include detecting a moving vehicle, a moving object, an inanimate object, a void, a person, and/or an animal in the one or more alarm zones, and warning a user of an intrusion of an object into or through the one or more alarm zones in step 610 can include warning the user of an approaching moving vehicle or moving object, or of the user approaching the inanimate object or void. Optionally step 604 can include detecting a person or animal in the one or more alarm zones, and warning a user of an intrusion of an object into or through the one or more alarm zones in step 610 can include warning a user of an approaching person or animal or of the user approaching the person or the animal.

Additionally or alternatively, the method 601 and/or 701 can include operating one or more second sensors to receive second sensor data or signals (not shown). Analyzing the MIR data in step 604 and determining or inferring an environment, hazard, or warning condition in step 606 can be performed based on the second sensor data.

Optionally, operating the MIR can be performed responsive to the second sensor data or signal, and/or operating the second sensor(s) can be performed responsive to the MIR data. The one or more second sensors can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a gaze sensor, a millimeter wave sensor, and/or a vibration sensor, for example.

As indicated above, the MIR may optionally be operated with variable power. Accordingly, operating the MIR in step 602 can include operating the MIR with variable probe power. The method 601 can further include receiving a probe power command through a user interface (not shown), and selecting a probe power for the micro-impulse radar responsive to the probe power command.

Alternatively or additionally, the method 601 can include performing one or more logic functions to select a MIR probe power responsive to the MIR data or responsive to data from a second sensor. For example, step 606 can include determining or inferring a danger condition from the MIR data. The method 601 can then include selecting a very high probe power and/or high probe rate responsive to the danger condition (not shown). Alternatively, the method 601 can include receiving data from a sensor or a communication interface (not shown) and selecting a probe power or rate for the MIR responsive to the data from the sensor or communication interface. Alternatively, the method 601 can include inferring that the personal electronic device is indoors from the data from the sensor or communication interface (not shown), and selecting a low probe power or rate for the micro-impulse radar responsive to the inference (not shown). Alternatively, the method 601 can include inferring that the personal electronic device is outdoors from the data from the sensor or communication interface (not shown) and selecting a high probe power for the MIR responsive to the inference (not shown).

Optionally, some or all of the method 601 shown in FIG. 6 can be embodied as computer readable instructions carried by non-transient computer readable media. Thus, the computer readable instructions can cause one or more computers to perform the steps.

Optionally, some or all of signal processing step 602, MIR data analysis in step 604, determining or inferring an environment, hazard, or warning condition in step 606, 614, creating, assembling or selecting a message in step 608, and/or outputting an indication, warning, or alarm to the user in step 610 an be performed by a remote resource.

FIG. 7 is a flow chart showing a method 701 for determining an environment, hazard, or warning condition for a user of a personal electronic device using a remote resource to process MIR data, according to an embodiment. Beginning with step 702, MIR data is received by the personal electronic device. Optionally, the method 701 can include a step (not shown) wherein the MIR data is transformed to second data corresponding to the MIR data. For example, the second data may include data about frequency domain or spatial domain objects that can be used as criteria for comparison to infer or determine an environment of the personal electronic device and/or the environment or identity of a user of the personal electronic device.

Proceeding to step 704, the MIR data (or second data corresponding to the MIR data) is transmitted to a remote resource. Process 601 is not necessarily performed by the personal electronic device, but is included in the flow chart of FIG. 7 for clarity.

Proceeding to step 706, one or more semaphores, messages, or data can be received from the remote resource for display to the user.

Proceeding to step 708, information or a warning can be displayed to a user. For example, the displayed information can include a view of objects in the vicinity of the personal electronic device and the user. Alternatively, the displayed information can include an audio or haptic warning output.

Referring again to FIG. 6, the method 601 can also include operating one or more second sensors to receive second sensor data or signals (not shown). Selecting one or more operating parameters in step 610 can include selecting the parameter(s) responsive to the MIR data and the second sensor data. Optionally, in some embodiments, step 610 can be performed responsive to second sensor data and not responsive to MIR data. Similarly, outputting data via a user interface in step 622 can be performed responsive to the second sensor data or signals, alone or in combination with the MIR data.

Optionally, operating the MIR in step 602 can be performed responsive to the second sensor data or signal, and/or operating the second sensor can be performed responsive to the MIR data. The one or more second sensors can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a microwave sensor, a gaze sensor, a millimeter wave sensor, and/or a vibration sensor, for example.

Optionally, some or all of the methods 601 and/or 701 shown in FIGS. 6 and 7 can be embodied as computer readable instructions carried by non-transient computer readable media. Thus, the computer readable instructions can cause one or more computers to perform the steps.

FIG. 8 is a block diagram of a system 801 including a network resource 802 configured to be operatively coupled to one or more personal electronic devices 402 including MIRs 101, according to an embodiment. The network resource 802 can be configured to receive MIR data from one or more personal electronic devices 402. A communications circuit 804 can be configured to operatively couple the one or more personal electronic devices 402 to the network resource 802. Each personal electronic device 402 can be operatively coupled to at least one MIR 101, and each personal electronic device 402 can be configured to transmit MIR data from the MIR 101 to the network resource 802. The network resource 502 can include a logic circuit 816 configured to analyze the MIR data from the one or more personal electronic devices 402. The logic circuit 816 can be further configured to perform one or more logical operations to determine an environment, hazard, or warning condition that is a function of the MIR data.

The personal electronic devices 402 can include one or more of cellular phones, smart phones, tablet computers, pagers, netbooks, notebook computers, or a combination thereof, for example. In some embodiments, at least a portion of the MIRs 101 can operatively coupled to at least a portion of the personal electronic devices 402 via exposed interfaces (not shown). Such exposed interfaces can include USB interfaces, SIM card interfaces, WiFi interfaces, BlueTooth interfaces, ZigBee interfaces, infrared interfaces, and/or proprietary interfaces, for example.

Alternatively, at least a portion of the MIRs 101 can be located inside at least a portion of the personal electronic devices 402. At least a portion of the one or more personal electronic devices 402 includes at least one component of a monostatic MIR 101. Alternatively or additionally, at least a portion of the one or more personal electronic devices 402 can include at least one component of a bistatic MIR 101.

According to some embodiments, the entire MIR 101 can be located inside at least a portion of the personal electronic devices 402, as depicted diagrammatically in FIG. 4.

As indicated above, the logic circuit 816 can be configured to perform one or more logical operations to determine an environment, hazard, or warning condition that is a function of the MIR data. Thus, analyzing the MIR data can include extracting environment information from the MIR data. The environment information can include signals or data that is indicative of one or more characteristics of one or more objects located in one or more regions 502a, 502b, 502c, 502d, 504a, 504b peripheral to the respective one or more personal electronic devices 402. Performing one or more logical operations responsive to the environment information can include determining display information for presentation to a user of the personal electronic device. The display information can include object data configured for output by an audio, video, or haptic output transducer.

The logic circuit 816 can be configured to perform one or more logical operations including comparing the MIR data to one or more criteria, determining one or more response conditions corresponding to the comparison, and selecting or determining the display information as a function of the one or more response conditions. Additionally or alternatively, the logic circuit 816 can select one or more MIR operating parameters responsive to the MIR data. For example, selecting one or more operating parameters for the MIR(s) responsive to MIR data can include selecting probe power, selecting probe direction, or selecting a time between probes responsive to detecting an object.

For example, the criteria to which the MIR data is compared can correspond to one or more hazard conditions. The one or more criteria can include or be based on one or more of range, strength-of-response, direction, spectral characteristics, polarization, Doppler characteristics, and/or a function thereof. For example, the one or more criteria can include an abstraction of a three-dimensional environment, wherein the abstraction corresponds to a presence, absence, movement, or physical property of one or more objects corresponding to a hazardous or dangerous environment for a user of the personal electronic device. Responsive to a determination of a hazardous or dangerous environment for the user of the personal electronic device, the logic circuit 816 can generate a semaphore for transmission to the one or more personal electronic devices 402 responsive to an environment condition peripheral to the respective personal electronic devices 402.

The logic circuit 816 can be configured to determine or infer if the personal electronic device 402 has a probability of being outdoors. The logic circuitry can then be configured to select a parameter to cause the personal electronic device 402 to select a high probe power for the MIR 101 responsive to determining or inferring that the personal electronic device has a probability of being outdoors. Similarly, the logic circuit 816 can be configured to determine or infer if the personal electronic device 402 has a probability of being indoors. The logic circuitry can be configured to then select a parameter to cause the personal electronic device 402 to select a low probe power for the MIR 101 responsive to determining or inferring that the personal electronic device 402 has a probability of being indoors.

At least a portion of the MIRs 101 can be configured to probe one or more regions including one or more alarm zones peripheral to the respective personal electronic devices 402. The logic circuit 816 can be configured to warn a user of a presence or absence of an object within the one or more alarm zones. The logic circuit 816 can also be configured to inform a user of a characteristic of an object within the one or more alarm zones. The logic circuit 816 can do this by outputting a parameter to cause the personal electronic device 402 to warn a user of an intrusion of an object into or through the one or more alarm zones. For example, at least a portion of the MIRs 101 can be configured to detect a moving vehicle or inanimate object in the one or more alarm zones. The logic circuit 816 can be configured to output a parameter to cause the personal electronic device to warn a user of an approaching moving vehicle or of the user approaching the inanimate object. Similarly, at least a portion of the MIRs can be configured to detect a person or animal in the one or more alarm zones. The logic circuit 816 can cause the personal electronic device to warn a user of the approaching person or animal or of the user approaching the person or the animal.

The display information can correspond to a warning selected or determined for output to the user via an audio transducer, a video transducer, a haptic transducer, or a combination thereof, and/or can correspond to one or more informational displays.

Optionally, at least a portion of the one or more personal electronic devices 402 can include one or more second sensors 420 operatively coupled to the personal electronic device 402. The network resource 802 can be configured to receive data or signals from the one or more second sensors 420. The logic circuit 816 can be configured to determine the environment, a hazard, or a warning condition responsive to the data or signals from the one or more second sensors 420 and data from the MIR 101. For example, the one or more second sensors 420 can include a microphone, a camera, a motion sensor, an accelerometer, a magnetic field sensor, an electronic compass, a gyroscope, a gravitational field sensor, a global positioning system receiver, a capacitive sensor, a microswitch, a light sensor, an infrared sensor, a radio frequency sensor, a millimeter wave sensor, and/or a vibration sensor, for example. Accordingly, a combination of MIR data and second sensor data can be used to determine or infer the environment, hazard or warning condition, and the combination of MIR data and second sensor data can be used together by the logic circuit 816 to select the parameter.

Optionally, in some embodiments, the MIR 101 can be omitted and the second sensor 420 can provide data for determining or inferring the environment 110, 502a, 502b, 502c, 502d, 504a, 504b of the personal electronic device 402. For example, a camera 420 on the personal electronic device 402 can provide data to determine if a motor vehicle is in the field-of-view of the camera 420, which in turn may be used by the logic circuit 816 to determine if an object is in a region 110, 502a, 502b, 502c, 502d proximate the personal electronic device 402. In another example, a microphone 420 can provide data to indicate if the personal electronic device 402 is in a quiet environment or a noisy environment 110, 502a, 502b, 502c, 502d and/or, using voice or sound recognition technology, whether the environment 110, 502a, 502b, 502c, 502d corresponds to a hazard or warning condition, or other environment.

Optionally, the network resource 802 can be further configured to output data corresponding to the MIR data received from a personal electronic device 402. Accordingly, the network resource 802 can be configured to output the data corresponding to the MIR data to the corresponding personal electronic device 402. Alternatively or additionally, the network resource 802 is configured to output the data corresponding to the MIR data to a console 814, to storage 812, or to a client or subscriber 402' other than the personal electronic device 402.

According to an embodiment, the data corresponding to the MIR data can include a location of objects (not shown) in the region 110, 502a, 502b, 502c, 502d imaged by the MIR 101 in association with a map. The network resource 802 can be configured to output the data corresponding to the MIR data as a minimally-processed representation of the MIR data. The network resource 802 can alternatively or additionally be configured to output the data corresponding to the MIR data as a processed representation of the MIR data.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A device, comprising:
    a personal electronic device including a logic circuit and a user interface; and
    at least one micro-impulse radar operatively coupled to the logic circuit and configured to probe one or more regions near the personal electronic device by emitting a pulse in the probed one or more regions;
    wherein the logic circuit is configured to,
        receive micro-impulse radar data including information about at least one of spatial location of an object, shape of an object, direction of movement of an object, velocity of movement of an object, or density of an object in the one or more regions,
        process the transmitted return signal to generate micro-impulse radar data including information about at least one of spatial location of an object, shape of an object, direction of movement of an object, velocity of movement of an object, or density of an object in the probed one or more regions,
        analyze the micro-impulse radar data to determine if a hazard condition exists for a user based on at least one of a presence of a person other than the user within the one or more regions, a proximity and velocity of movement of an object relative to the user, a void in the one or more regions, or an uneven terrain in the one or more regions, and
        in cooperation with the user interface, at least conditionally provide information about the one or more regions to the user.

2. The device of claim 1, wherein the personal electronic device includes a cellular phone, a smart phone, a personal data assistant, a pager, a tablet computer, a netbook, a notebook computer, or a combination thereof.

3. The device of claim 1, wherein the micro-impulse radar includes a signal processor embodied as software or firmware running on a microcontroller or microprocessor shared by the logic circuit.

4. The device of claim 1, wherein the micro-impulse radar is configured to detect and provide a return signal responsive to the pulse to the logic circuit.

5. The device of claim 1, wherein the micro-impulse radar includes a signal processor configured to convert a detected return signal responsive to the pulse to micro-impulse radar data; and
    wherein the micro-impulse radar is configured to output the micro-impulse radar data to the logic circuit.

6. The device of claim 1, wherein the one or more regions near the personal electronic device correspond one or more possible locations of a person or animal proximate to the personal electronic device.

7. The device of claim 1, wherein the one or more regions near the personal electronic device correspond one or more regions probed by the micro-impulse radar.

8. The device of claim 1, wherein the one or more regions near the personal electronic device correspond one or more regions not within a direct line of sight from the personal electronic device.

9. The device of claim 1, wherein the one or more regions near the personal electronic device correspond to one or more regions outside the current field-of-view of a user of the personal electronic device.

10. The device of claim 1, wherein the one or more regions near the personal electronic device correspond to one or more regions along a direction of travel of the personal electronic device.

11. The device of claim 1, wherein the personal electronic device is configured to output user perceptible data corresponding to the micro-impulse radar data.

12. The device of claim 1, wherein the user interface includes one or more of a haptic or audio output device.

13. The device of claim 1, wherein the personal electronic device is configured to output a processed representation of the micro-impulse radar data.

14. The device of claim 1, wherein the one or more regions include one or more alarm zones.

15. The device of claim 1, wherein the micro-impulse radar data includes information related to a velocity of motion of one or more objects in the one or more regions.

16. The device of claim 1, wherein the micro-impulse radar data includes information related to one or more physiological parameters of one or more persons in the one or more regions.

17. The device of claim 1, wherein the logic circuit is configured to receive, from the user interface, user commands corresponding to one or more interactions between the micro-impulse radar and the logic circuit.

18. The device of claim 1, wherein the personal electronic device further comprises:
    one or more second sensors operatively coupled to the logic circuit.

19. A method, comprising:
    emitting a pulse from a micro-impulse radar operatively coupled to a personal electronic device including a logic circuit configured to process a return signal responsive to the emitted pulse to produce micro-impulse radar data;
    receiving a return signal responsive to the pulse;
    processing the return signal to produce micro-impulse radar data including at least one of spatial location of an object, shape of an object, direction of movement of an object, velocity of movement of an object, or density of an object;
    analyzing the micro-impulse radar data to determine if a hazard condition exists for a user based on at least one of a presence of a person other than the user within the one or more regions, a proximity and velocity of movement of an object relative to the user, a void in the one or more regions, or an uneven terrain in the one or more regions; and
    at least conditionally outputting user-perceptible data responsive to the micro-impulse radar data.

20. The method of claim 19, wherein the personal electronic device includes a cellular phone, a smart phone, a personal data assistant, or a tablet computer.

21. The method of claim 19, wherein processing the return signal to produce micro-impulse radar data radar includes operating a signal processor embodied as software or firmware running on a microcontroller or microprocessor shared by a personal electronic device logic circuit.

22. The method of claim 19, wherein emitting a pulse includes probing one or more regions located peripheral to the personal electronic device.

23. The method of claim 19, wherein at least conditionally outputting the user perceptible data includes displaying an indication of objects in one or more regions probed by the micro-impulse radar.

24. The method of claim 19, wherein outputting user-perceptible data includes outputting a processed representation of the micro-impulse radar data.

25. The method of claim 19, wherein outputting user-perceptible data includes outputting the user-perceptible data on a user interface of the personal electronic device.

26. The method of claim 19, further comprising:
receiving user input related to operating the micro-impulse radar or related to at least conditionally outputting the user-perceptible data.

27. The method of claim 19, further comprising:
selecting one or more operating parameters of the micro-impulse radar.

28. The method of claim 19, further comprising:
analyzing the micro-impulse radar data to determine whether to output the user perceptible data.

29. The method of claim 19, further comprising:
analyzing the micro-impulse radar data to extract one or more parameters.

30. The method of claim 19, wherein analyzing the micro-impulse radar data to determine if a hazard condition exists further comprises:
comparing the micro-impulse data or one or more parameters extracted from the micro-impulse radar data to one or more criteria including at least one of the presence of a person other than the user within the one or more regions, the proximity and velocity of movement of an object relative to the user, presence of a void in the one or more regions, or presence of an uneven terrain in the one or more regions; and
determining whether to output the user-perceptible data responsive to the comparison.

31. The method of claim 19, further comprising:
analyzing the micro-impulse radar data to determine or infer an environment of the personal electronic device.

32. The method of claim 19, wherein emitting a pulse includes probing one or more alarm zones.

33. The method of claim 19, further comprising:
transmitting data corresponding to the micro-impulse radar data to a remote resource; and
receiving, from the remote resource, data for output to the user.

34. The method of claim 19, wherein the micro-impulse data includes information related to a velocity of motion of one or more objects in one or more regions near the personal electronic device.

35. The method of claim 19, wherein the micro-impulse data includes information related to one or more physiological parameters of one or more persons in one or more regions near the personal electronic device.

36. The method of claim 19, further comprising:
operating one or more second sensors to receive second sensor data or signals.

37. A system, comprising:
at least one micro-impulse radar configured to emit a pulse, receive a return signal responsive to the emitted pulse, and process the return signal responsive to the emitted pulse to generate micro-impulse radar data including at least one of spatial location of an object, shape of an object, direction of movement of an object, velocity of movement of an object, or density of an object;
one or more personal electronic devices each being operatively coupled to at least one of the at least one micro-impulse radars and configured to transmit the micro-impulse radar data to a network resource;
the network resource configured to receive micro-impulse radar data from the one or more personal electronic devices; and
communications circuitry operatively coupling the one or more personal electronic devices to the network resource;
wherein the network resource further comprises:
a logic circuit configured to analyze the micro-impulse radar data from the one or more personal electronic devices and perform one or more logical operations responsive to the micro-impulse radar data including determining if a hazard condition exists for a user based on at least one of a presence of a person other than the user within the one or more regions, a proximity and velocity of movement of an object relative to the user, a void in the one or more regions, or an uneven terrain in the one or more regions.

38. A method for determining an environment of a personal electronic device, comprising:
emitting a pulse from a micro-impulse radar operatively coupled to one or more personal electronic devices operatively coupled to one or more logic circuits;
receiving a return signal responsive to the emitted pulse;
processing the return signal to produce micro-impulse radar data including at least one of spatial location of an object, shape of an object, direction of movement of an object, velocity of movement of an object, or density of an object;
receiving micro-impulse radar data from one or more personal electronic devices at the one or more logic circuits;
analyzing the micro-impulse radar data using the one or more logic circuits to determine characteristics of objects in a region probed by a pulse from the micro-impulse radar; and
performing one or more logical operations responsive to the micro-impulse radar data using the one or more logic circuits to determine if a hazard condition exists for a user based on at least one of a presence of a person other than the user within the one or more regions, a proximity and a velocity of movement of an object relative to the user, a void in the one or more regions, or an uneven terrain in the one or more regions.

39. The method of claim 38, further comprising:
storing or transmitting second data corresponding to the received micro-impulse radar data.

40. The method of claim 38, wherein analyzing the micro-impulse radar data includes extracting environment information from the micro-impulse radar data.

41. The method of claim 38, wherein performing one or more logical operations responsive to the micro-impulse radar data includes determining display information for presentation to a user of the personal electronic device.

42. The method of claim 38, wherein the one or more logical operations includes generation of a signal for transmission to the one or more personal electronic devices responsive to an environment condition peripheral to the respective personal electronic devices.

43. The method of claim 38, wherein the one or more logical operations includes modification of a user interface operational parameter of the respective personal electronic device.

44. The method of claim 38, wherein receiving the micro-impulse radar data, analyzing the micro-impulse radar data, and performing one or more logical operations responsive to the micro-impulse radar data is performed by a network resource operatively coupled to the one or more personal electronic devices across a communication network.

45. The method of claim 38, wherein the one or more personal electronic devices includes a cellular phone, a smart phone, a personal data assistant, a pager, a tablet computer, a netbook, a notebook computer, or a combination thereof.

46. The method of claim 38, wherein the each of the one or more personal electronic devices is operatively coupled to at least one micro-impulse radar exclusive to each one or more personal electronic device.

47. The method of claim 38, wherein at least one of the micro-impulse radars is located inside one of the one or more personal electronic devices.

48. The method of claim 38, wherein the logical operation is responsive to at least one parameter that is a function of the micro-impulse radar data.

49. The method of claim 38, wherein analyzing the micro-impulse radar data includes determining or inferring an environment of a particular personal electronic device.

50. The method of claim 38, wherein determining or inferring an environment includes determining or inferring if the particular personal electronic device has a probability of being outdoors; and performing one or more logical operations includes transmitting to the particular personal electronic device a parameter selected to cause the particular personal electronic device to select a high probe power for an associated micro-impulse radar responsive to determining or inferring that the particular personal electronic device has a probability of being outdoors.

51. The method of claim 38, wherein determining or inferring an environment includes determining or inferring if the particular personal electronic device has a probability of being indoors; and wherein performing one or more logical operations includes transmitting to the particular personal electronic device a parameter selected to cause the particular personal electronic device to select a low probe power for an associated micro-impulse radar responsive to determining or inferring that the particular personal electronic device has a probability of being indoors.

52. The method of claim 38, wherein the micro-impulse radar data includes information corresponding to one or more probes of one or more alarm zones peripheral to the respective one or more personal electronic device.

53. The method of claim 38, further comprising:

receiving sensor data from the one or more personal electronic devices.

54. The method of claim 38, wherein performing one or more logical operations responsive to the micro-impulse radar data includes outputting data corresponding to the micro-impulse radar data.

\* \* \* \* \*

UNITED STATES PATENT AND TRADEMARK OFFICE
CERTIFICATE OF CORRECTION

PATENT NO. : 8,884,809 B2  Page 1 of 1
APPLICATION NO. : 13/136404
DATED : November 11, 2014
INVENTOR(S) : Roderick A. Hyde et al.

It is certified that error appears in the above-identified patent and that said Letters Patent is hereby corrected as shown below:

In The Claims

Column 23
Claim 6, Line 62, change "the personal electronic device correspond one or more" to --the personal electronic device correspond to one or more--

Column 23
Claim 7, Line 66, change "the personal electronic device correspond one or more" to --the personal electronic device correspond to one or more--

Column 28
Claim 52, Line 20, change "one or more personal electronic device" to --one or more personal electronic devices--

Signed and Sealed this
Seventeenth Day of March, 2015

Michelle K. Lee
*Director of the United States Patent and Trademark Office*